US006290798B1

(12) United States Patent
Onishi et al.

(10) Patent No.: US 6,290,798 B1
(45) Date of Patent: Sep. 18, 2001

(54) METHOD FOR FORMING PRINTED PRODUCT

(75) Inventors: Jiro Onishi; Shinichi Kurokawa; Katsuyuki Oshima, all of Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 09/268,783

(22) Filed: Mar. 16, 1999

(30) Foreign Application Priority Data

Mar. 17, 1998 (JP) ........................................ 10-066676
Mar. 20, 1998 (JP) ........................................ 10-072711

(51) Int. Cl.[7] .......................... B44C 1/165; B32B 31/04; B41M 3/12

(52) U.S. Cl. .......................... 156/230; 156/234; 156/235; 156/240; 156/241; 156/247; 156/289; 427/146; 427/147; 427/148; 428/914

(58) Field of Search .................................. 156/230, 234, 156/235, 237, 239, 240, 241, 247, 277, 289; 427/146, 147, 148, 149; 428/195, 914; 8/467, 468, 471

(56) References Cited

U.S. PATENT DOCUMENTS 4,968,659 * 11/1990 Nishitani .............................. 503/227
5,734,396 * 3/1998 Hale et al. ............................. 347/54
5,871,837 * 2/1999 Adair .................................. 428/206
6,017,636 * 1/2000 Tada et al. ........................ 428/423.1

* cited by examiner

*Primary Examiner*—Richard Crispino
*Assistant Examiner*—J. A. Lorengo
(74) *Attorney, Agent, or Firm*—Ladas & Parry

(57) ABSTRACT

An object of the present invention is to provide a method for preparing a printed product in which a transfer layer of an intermediate transfer recording medium can be transfer via a transferring adhesive layer having a suitable adhesive property to either one of the transfer layer and a transfer-receiving material, and thus transferred images do not have turbulence. This objects can be achieved by providing, a method for forming a printed product through that a transfer layer bearing an image is transferred on a transfer-receiving material via a transferring adhesive layer, characterized in that the method comprises following steps. The first step is preparing an intermediate transfer recording medium comprising at least a base film and the transfer, and an adhesive layer transfer sheet comprising at least a substrate sheet and the transferring adhesive layer comprising at least an uppermost layer and a basement layer. And the second step is carrying out a first transfer step in which the transferring adhesive layer is transferred on the transfer layer bearing the image in advance, and a second transfer step in which the transfer layer on which the transferring adhesive layer is transferred, transfers on the transfer-receiving material.

1 Claim, 7 Drawing Sheets

METHOD FOR FORMING PRINTED PRODUCT

BACKGROUND OF THE INVENTION

The present invention relates to a method for preparing a printed product which is prepared by transferring a transfer layer of an intermediate transfer recording medium on which an image is formed, via a transferring adhesive layer, on a surface of a transfer-receiving material with an excellent adhesive property.

There have been known a method to prepare a printed product using an intermediate transfer recording medium. The intermediate transfer recording medium is hitherto used to form a printed product which is formed that an image is recorded on a receptor layer, then the receptor layer is transferred on a transfer-receiving material. On the receptor layer, since images are recorded by thermal transfer recording methods using a thermal transfer sheet, depending on a composition of materials, high quality images can be formed. Further, because a receptor layer may have an excellent adhesive property with a transfer-receiving material, or can be transferred to a transfer-receiving material via an adhesive layer with an satisfied adhesive property, this method is preferably used for a transfer-receiving material on which high quality images can not be formed directly because coloring materials hardly migrate to the transfer-receiving material, and which easily fuse and adhere to a coloring material layer during thermal transferring.

FIG. 12 shows a schematic sectional view of one example of a typical intermediate transfer recording medium. An intermediate transfer recording medium 101 is composed of a base film 102 and a transfer layer 112 which comprises at least a receptor layer 105. On the receptor layer 105, images 106 is formed through thermal transferring with a thermal-transferring sheet having a coloring material layer. The transfer layer 112 having the receptor layer 105 on which images 106 is formed, is separated from a base film 102, and transferred on the transfer-receiving material, then images 106 as an objective are formed on the transfer-receiving material.

Through using such an intermediate transfer recording medium, high resolution and high quality images can be transferred and formed on a transfer-receiving material. Because the required images such as a letter and a photograph of one's face are formed on the transfer layer of the intermediate transfer recording medium in advance, then images can be formed on the transfer-receiving material by transferring, this method is superior to the others on the point in which the images can be easily formed on transfer-receiving material even if the images exist individually such as a booklet of a passport and a base material of a card, accordingly it uses preferably. Further, the images can be formed through that required matters such as a signature are entered or printed on a transfer-receiving material in advance, then a transfer layer formed images such as letters and pictures can be transferred from the intermediate transfer recording medium. Therefore, the intermediate transfer recording medium can be preferably used to form an identification document such as a passport, and a printed product such as a credit card, an ID card, and so on.

In this sort of thermal transfer method, a thermal transfer sheet, composed of a coloring material layer formed on a base film, and a transfer-receiving material on which a receptor layer is formed as occasion demands, are pressure-welded between a heating device such as thermal head and a platen roll, and heating portions of the heating device are selectively heated in accordance with an information of images to be transferred, so that a coloring material contained in the coloring material layer on the thermal transfer sheet is transferred on the transfer-receiving material thereby to record the images thereon. These thermal transfer methods are generally classified into a fusion thermal transfer method and a sublimation transfer method.

The fusion thermal transfer method is a method in which a thermal transfer sheet carrying a heat fusible ink layer is heated by the heating means of the type mentioned above and a softened heat fusible ink is transferred on a transfer-receiving material such as natural fiber paper or plastic sheet thereby to form an image on the transfer-receiving material. The heat fusible ink layer used in this method will be prepared by dispersing a coloring material such as pigment into a binder such as heat fusible wax or resin, and the heat fusible ink layer is carried by a base film such as plastic film. An image formed by this fusion thermal transfer method has an improved high density and sharpness, and hence, this method is more applicable to the recording of binary images such as letters or lines. Colored or multiple-colored images can be formed by using a thermal transfer sheet provided with heat fusible ink layers of yellow, magenta, cyan, black and the like and recording them on the transfer-receiving material.

On the other hand, the sublimation thermal transfer method is a method in which a thermal transfer sheet carrying a sublimation dye layer is heated by the heating means of the type mentioned above so as to sublimate the sublimation dye contained in the dye layer, and the dye is then transferred on a receptor layer formed on the transfer-receiving material, thus forming an image. The sublimation dye layer used in this method will be prepared by dissolving or dispersing the sublimation dye as coloring material into a binder such as resin, and the sublimation dye layer is carried by a base film such as plastic film. According to such sublimation thermal transfer method, since transferring amount of the dye can be controlled in dot unit in accordance with energy amount of the heating device such as thermal head, a gradation reproduction due to density modulation can be made possible. Furthermore, since the dye material is used as a coloring material, the thus formed image has a transparency, and hence, this method is superior to the reproduction of the intermediate colors at a time when a plurality of dye layers of a plurality of colors are transferred in an overlapped manner. For this reason, a full-colored image with high quality can be formed by transferring the sublimation dye of three or four colors of yellow, magenta and cyan, in addition to black, on the transfer-receiving material in an overlapped manner by using the thermal transfer sheet provided with sublimating dye layers of these three or four colors.

In these image forming methods, it is necessary particularly for the sublimation thermal transfer method that the transfer-receiving material on which an image is to be formed is provided with a dyeing property of the dye. Because of this reason, in a case where the surface of the transfer-receiving material has a less dyeing property, it is almost difficult to form an image on the transfer-receiving material as far as the receptor layer is provided thereon.

For example, the Japanese Patent Laid-open Publication No. SHO 62-264994 discloses a technique for providing a receptor layer on a transfer-receiving material having no dyeing property in a manner that a receptor layer transfer sheet formed by providing the receptor layer on a base film to be separable is preliminarily prepared and this receptor layer is transferred on the transfer-receiving material.

According to this technique, a dye is transferred from a dye layer of a thermal transfer sheet to the receptor layer already transferred on the transfer-receiving material to thereby form an image.

Furthermore, in the Japanese patent Laid-open Publication No. SHO 62-238791 and the Japanese patent Laid-open Publication No. HEI 4-133793, there is disclosed a technique such that an intermediate transfer recording medium formed by providing the receptor layer on a base film to be separable is preliminarily prepared and an image is formed by transferring a dye from a thermal transfer sheet on this receptor layer. Thereafter, the receptor layer bearing the image is transferred to the transfer-receiving material by heating thus formed the intermediate transfer recording medium. According to these methods, not only on transfer-receiving material with an satisfied dyeing property, but also on transfer-receiving materials with a less dyeing property, and with easily melt-adhering property by heating from thermal head and the like, images can be transferred and formed. An bad influence of uneven surface and formation of a transfer-receiving material can be prevented.

To improve a poor quality of transferring which occurs in the case that adhesive strength between a receptor layer bearing an image and transfer-receiving material is not enough, adhesive strength between the receptor layer and the transfer-receiving material is increased through transferring an adhesive layer on the receptor layer of an intermediate transfer recording medium and/or transfer-receiving material from an adhesive layer transferring sheet, such as disclosing in the Japanese patent Laid-open Publication No. HEI 7-52522.

However, in case using above-mentioned adhesive layer transfer sheet, there are some cases that the problem of adhesive failure can not be solved because adhesive strength between the receptor layer and the transfer-receiving material is not able to increase. For example, in some cases, an adhesive layer had enough adhesive property with a receptor layer, but not enough with a transfer-receiving material, and there were opposite cases.

The reason why such a case occurs particularly result from recent requirement of a high resolution and a high quality and variety of transfer-receiving material. That is, in order to form an image having a high resolution, the materials of the receptor layer on the outermost surface of the intermediate transfer recording medium are limited, because the receptor layer formed on the outermost surface of the intermediate transfer recording medium must have an excellent dyeing property and be formed by the material which has a excellent thermal separating property with dye transfer sheet. Accordingly, an adhesive layer suitable for a receptor layer to be used, must be selected.

The other side, a demand such that high resolution and high quality images are transferred and formed on the various transfer-receiving materials, is increasing. For example, when required matters for identification such as a picture of one's face and the like print through use of thermal transfer method, usually natural paper is used for a passport, and the quality of the natural paper is different in each country, some of them are worse about smoothness. When images are used for an identification document such as a passport and the like, a receptor layer bearing the image must adhere firmly on the transfer-receiving material, and not be separable easily, thus an adhesive layer suitable for transfer-receiving material must be selected.

Accordingly, there is a problem that an adhesive layer suitable for a receptor layer does not always coincide with an adhesive layer suitable for a transfer-receiving material.

Recently, there is a demand to a printed product, on which the printed product is formed such that a part of a transfer layer of an intermediate transfer recording medium is transferred on the required portion of a transfer-receiving material. For example, there are some cases that a transfer layer on which a picture of one's face is formed to the only designated section of an identification document and a passport. However, conventionally, an adhesive layer is transferred on all surface of a transfer layer of an intermediate transfer recording medium, by means of a roller transfer which is efficient as a transfer method, then a printed product is obtained through transferring the transfer layer on transfer-receiving material via adhesion layer by means of a roller transfer, again. Accordingly, it is impossible to transfer a part of a transfer layer on a transfer-receiving material with a satisfactory adhesive property.

In case an image is formed on a transfer-receiving material by using an intermediate transfer recording medium, it is carried out by thermal transfer method, which does not depend on via an adhesive layer or not. As a result, there are some possibility that turbulence generate in an image of a printed product because of softening or fluidization of a receptor layer bearing an image.

SUMMARY OF THE INVENTION

A first object of the present invention is to provide a method for preparing a printed product in which a transfer layer of an intermediate transfer recording medium can be transfer with sufficient adhesive property on a surface of a transfer-receiving material through that an adhesive layer has a suitable adhesive property for adhering with both of a transfer layer and a transfer-receiving material, a part of a transfer layer can be pattern-transferred on a transfer receiving material, and thus transferred images do not have turbulence.

A second object of the present invention is to provide an adhesive layer transfer sheet which can transfer an adhesive layer having an adhesive property suitable for both of a receptor layer and a transfer-receiving material, in case there is no single sort of a material having an adhesive property suitable for both of a receptor layer as an outermost layer of an intermediate transfer recording medium and a transfer-receiving material, in order to transfer the receptor layer of the intermediate transfer recording medium on the transfer-receiving material. Further object of the present invention is to provide a printed product formed through transferring a receptor layer of an intermediate transfer recording medium on a surface of a transfer-receiving material with a sufficient adhesive property, by means of the adhesive layer of the adhesive layer transfer sheet.

These and other objects can be achieved according to the present invention by providing, in one aspect, a method for forming a printed product comprising steps of;

preparing an intermediate transfer recording medium comprising at least a base film and a transfer layer which comprises at least a receptor layer to be formed on the base film separably and born an image, and usable for transferring the transfer layer after bearing the image on a transfer-receiving material, and an adhesive layer transfer sheet comprising at least a substrate sheet and a transferring adhesive layer formed on the substrate sheet to be separable, in which the transferring adhesive layer comprises at least an uppermost layer having an adhesive property suitable for the receptor layer of the intermediate transfer recording medium and arranged at a farthest portion from the substrate sheet, and a basement layer having an adhesive property suitable for a surface of the transfer-receiving material, forming a different material from a material of the uppermost layer, and arranged at a closest portion from the substrate sheet, carrying out a first transfer step in which the transferring adhesive layer is transferred on the transfer layer bearing the image in advance, and a second transfer step in which the transfer layer on which the transferring adhesive layer is transferred, transfers on the transfer-receiving material, and then the transfer layer bearing the image is transferred on the transfer-receiving material via the transferring adhesive layer.

In the other aspect of the present invention, there is also provided a method for forming a printed product comprising steps of:

preparing an intermediate transfer recording medium comprising at least a base film and a transfer layer which comprises at least a receptor layer to be formed on the base film separably and born an image, and usable for transferring the transfer layer after born the image on a transfer-receiving material, and an adhesive layer transfer sheet comprising at least a substrate sheet and a transferring adhesive layer formed on the substrate sheet to be separable, in which the transferring adhesive layer comprises at least a uppermost layer having an adhesive property suitable for a receptor layer of the intermediate transfer recording medium and arranged at a closest portion from the substrate sheet, and a basement layer having an adhesive property suitable for a surface of the transfer-receiving material, forming a different material from a material of the uppermost layer, and arranged at a farthest portion from the substrate sheet, carrying out a first transfer step in which the transferring adhesive layer is transferred on the transfer-receiving material, and a second transfer step in which the transfer layer is transferred on the transfer-receiving material on which the transferring adhesive layer is transferred, and then the transfer layer bearing the image transfers on the transfer-receiving material via the transferring adhesive layer.

According to this aspect, since a printed product is formed by transferring a transfer layer on a transfer-receiving material via a transferring adhesive layer comprising an uppermost layer which have a adhesive property suitable for a transfer layer of an intermediate transfer recording medium, and a basement layer which have a adhesive property suitable for a surface of the transfer-receiving material, the transfer layer can be formed firmly on the transfer-receiving material not to depend on the material of the transfer layer and the transfer-receiving material. Accordingly, defects of transferring and separating in a transfer step do not occur, and the printed product having a satisfied quality can obtained. Since, as a first transfer step, a transferring adhesive layer is transferred on either one of the transfer layer of the intermediate transfer recording medium or the transfer-receiving material, then as a second transfer step, it is transferred another one, an effective method for forming a printed product can be selected in accordance with a form of transfer-receiving material, and so on.

In the method for forming the printed product of the present invention, preferably, the first transfer step is the step in which a transfer-pattern of the transferring adhesive layer is thermal-transferred on the transfer layer bearing images in advance, and the second step is the step in which the transfer layer having the same transfer-pattern as the transfer-pattern formed on the transferring adhesive layer transferred on the transfer layer, is roller-transferred on the transfer-receiving material via the transferring adhesive layer.

According to this method, since the transferring adhesive layer formed as the required transfer-pattern by heating can be transferred on the transfer layer, after that the transfer layer can be transferred on the transfer-receiving material with the required transfer-pattern by means of the economically effective roller-transfer.

Further, in the method for forming the printed product, the adhesive layer transfer sheet comprises at least one coloring material layer selected from the group consisting of sublimation dye layers having various colors and heat fusible ink layers having various colors, and the transferring adhesive later, and these layers are formed so as to laterally arrange them along the surface of the substrate sheet. And in the first transfer step, the image is formed through migrating the coloring material from the coloring material layer formed on the adhesive layer transfer sheet, before the transferring adhesive layer of the adhesive layer transfer sheet is transferred on the transfer layer of the intermediate transfer recording medium.

According to this method, since in the adhesive layer transfer sheet, the various coloring material layers for forming the image and the transferring adhesive layer is formed so as to laterally arrange them along a surface of the substrate sheet, on the transfer layer of the intermediate transfer recording medium, color images and letters is transferred and formed, further the transferring adhesive layer can be transferred and formed on a series of continuous process. Thus, the process for forming the images can reduce, and preferable from the point of cost.

Further, preferably, in the method for forming the printed product, the first transfer step is the step in which the transfer-pattern of the heated transferring adhesive layer is thermal-transferred on the transfer-receiving material, and the second transfer step is the step in which the transfer layer having the same transfer-pattern as the transfer-pattern of the transferring adhesive layer transferred on the transfer-receiving material is roller-transferred on the transfer-receiving material from the intermediate transfer recording medium via the transferring adhesive layer.

According to the above-mentioned method, since the transferring adhesive layer formed with the required transfer-pattern by heating can be transferred on the transfer-receiving material, the transfer layer of the intermediate transfer recording medium can be transferred on the transferring adhesive layer transferred on the transfer-receiving material with the required transfer-pattern, and adhered firmly, through use of the roller-transfer effective from the economical point.

According to the above mentioned method for forming the printed product, since the transfer layer with the image has an excellent adhesive property with the uppermost layer in the transferring adhesive layer, and the transfer-receiving material has an excellent adhesive property with the basement layer of the transferring adhesive layer, the transfer layer can firmly arrange on the transfer-receiving material, regardless of the materials and the like of the transfer-receiving material. Accordingly, the printed product on which defects of transferring and separation of the image do not occur, can be obtained. And when a passport paper with an identification column is used as the transfer-receiving material, since the transfer layer bearing the image is arranged with an excellent adhesive property, for example, the passport, on which chipping the images such as a picture of one's face and identification matters and separating the transfer layer do not occur, can obtained.

In the other aspect of the present invention, there is provided an adhesive layer transfer sheet comprising at least a substrate sheet and a transferring adhesive layer formed on the substrate sheet to be separable, and using in order to transfer the transferring adhesive layer on a receptor layer of an intermediate transfer recording medium, in which the transferring adhesive layer comprises at least an uppermost layer having an adhesive property suitable for the receptor layer of the intermediate transfer recording medium and arranged at a farthest portion from the substrate sheet, and a basement layer having an adhesive property suitable for a surface of a transfer-receiving material, formed of a different material from a material of the uppermost layer, and arranged at a closest portion from the substrate sheet.

According to this invention, since the uppermost layer in the transferring adhesive layer has a adhesive property suitable for the receptor layer, the intermediate transfer recording medium with the adhesive layer which firmly adheres on the receptor layer of the intermediate transfer recording medium and does not deteriorate in proportion to time passing, is obtained. At this time, since the basement layer having a suitable adhesive property to a surface of the transfer-receiving material, is positioned on a surface of the obtained intermediate transfer recording medium, the receptor layer of the intermediate transfer recording medium can transfer on the transfer-receiving material with an excellent adhesive property through the basement layer which firmly adheres to the transfer-receiving material, and do not have the problem about adhesiveness such as deterioration in proportion to time passing. Accordingly, even when the adhesive layer formed of single material can not obtain the enough adhesiveness to both of the receptor layer of the intermediate transfer recording medium and the transfer-receiving material, the adhesive layer transfer sheet of the present invention solves the problem, and can transfer to the either layers with the excellent adhesiveness.

Preferably, the basement layer is formed of the materials which have an excellent adhesive property to nature paper, concretely, the material contains ionomer, polyvinyl pyrrolidone or polyamide. In this case, more preferably, the basement layer comprised ionomer combines with the uppermost layer via an intermediate layer. At this time, the basement layer contained ionomer, preferably connected with the uppermost layer via the intermediate layer. According to this method, when the transfer-receiving material is the nature paper, the receptor layer of the Intermediate transfer recording medium be transferred on the nature paper with satisfied adhesiveness.

Further, the uppermost layer is preferably formed of a resin having the glass-transition temperature of not less than 60° C. According to using this material, when the adhesive layer transfer sheet is kept under the condition such that the adhesive layer transfer sheet is rolled up, or pile up, the blocking, that is, the uppermost layer stick to the back surface of the substrate sheet, can prevent.

The adhesive layer transfer sheet according to the present invention, preferably, comprises at least one coloring material layer selected from the group consisting of sublimation dye layers having various colors and heat fusible ink layers having various colors, and the transferring adhesive later, and these layers are formed so as to laterally arrange them along the surface of the substrate sheet, each coloring material layer is formed as the plane shape and size not to be wasted and to fit an individual image forming area allotting on a surface of the transfer-receiving material, on which the image is transferred and formed by using the intermediate transfer recording medium, and the transferring adhesive layer is formed as the plane shape and size not to be wasted and to fit a receptor layer transfer area of a surface of the transfer-receiving material.

According to this invention, since the various coloring material layer to form the image and the adhesive layer are formed so as to laterally arrange them along a surface of the substrate sheet, color images and letters can be transferred and formed on the receptor layer of the intermediate transfer recording medium, then the adhesive layer can be transferred and formed in the series of the continuos process. Thus, the process for forming the image can reduce, and it is preferable from the economical point.

A printed product of the present invention comprises at least a transfer-receiving material, a transferring adhesive layer arranged on the transfer-receiving material, and a receptor layer bearing an image arranged on the transferring adhesive layer, in which the transferring adhesive layer comprises at least an uppermost layer having an adhesive property suitable to the receptor layer and adhering to the receptor layer, and a basement layer formed of a different material from a material of the uppermost layer, having an adhesive property suitable to the transfer-receiving material, and adhering to the transfer-receiving material. In this case, the transfer-receiving material may be nature paper having a smoothness of 10-1500 seconds as Bec's smoothness.

According to this invention, since the receptor layer bearing images has excellent adhesiveness with the uppermost layer of the transferring adhesive layer, and the transfer-receiving layer has excellent adhesiveness with the basement layer of the transferring adhesive layer, the receptor layer can be arranged on the transfer-receiving material with firm adhesiveness regardless of the a material of the transfer-receiving material. Accordingly, the printed product on which defects of transferring and separating an image do not occur, can be obtained. Further, when a passport paper with an identification column is used as the transfer-receiving material, since the receptor layer bearing the image is arranged with an excellent adhesive property, for example, the passport, on which chipping the images such as a picture of one's face and identification matters and separating the transfer layer do not occur, can obtained.

DESCRIPTION OF THE PREFERRED EMBODIMENTS

First, it will be illustrated that an intermediate transfer recording medium using a method for forming a printed product according to the present invention.

Figure 1:
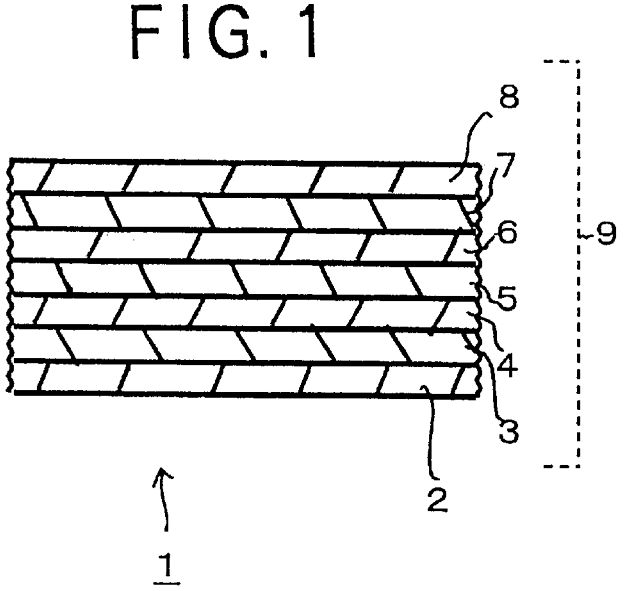
FIG. 1 is a schematically sectional view of one example of an intermediate transfer recording medium using the present invention.

FIG. 1 shows a sectional view of one example of an intermediate transfer recording medium. An intermediate transfer recording medium 1 using this invention uses for transferring a transfer layer 9 after forming an image on a transfer-receiving material. The intermediate transfer recording medium 1 is comprises at least a base film 2 and a transfer layer 9 arranged on the base film 2 to be separable, and the transfer layer 9 at least comprises a receptor layer 8 on which an image is formed, and is used for transferring the transfer layer 9 bearing the image on the transfer-receiving material.

In the transfer layer 9, each layer of a release layer 3, a protecting layer 4, a hologram layer 5, a transparent vapor deposition layer 6, an anchor layer 7, and a receptor layer 8 can be laminated from a side of the base film 2 in this order. Further, instead of these layers or adding to these layer, a conventional layer such as an ultraviolet rays absorption layer may be arranged as the occasion demands. These layers are shown the action and the effect which is well known until now, and the composition of the layers do not be limited. The detail of each layer will describe later.

The adhesive layer transfer sheet using a method for forming a printed product will be described in detail hereunder.

Figure 2:
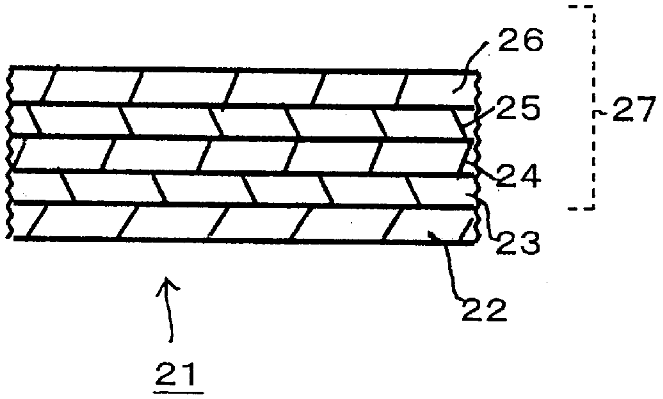
FIG. 2 is a schematically sectional view of one example of an adhesive layer transfer sheet according to the present invention.

FIG. 2 is a schematic sectional view shown one example of an adhesive layer transfer sheet. An adhesive layer transfer sheet 21 used in the present invention, uses to adhere a transfer layer 9 of an intermediate transfer recording medium 1 after forming a image, and a transfer-receiving material, firmly. An adhesive layer transfer sheet 21 comprises at least a substrate sheet 22 and a transferring adhesive layer 27 (hereinafter, referred as to "adhesive layer 27") arranged on the substrate sheet 22 to be separable. The adhesive layer 27 of the adhesive layer transfer sheet 21 is used for, first, transferred either on the transfer layer 9 of the intermediate transfer recording medium 1, or on the transfer-receiving layer, then transferred on another one with the transfer layer or the transfer-receiving layer on which the adhesive layer is transferred.

An adhesive layer 27 comprises at least an uppermost layer 26 having a suitable adhesive property to transfer layer 9 of the intermediate transfer recording medium 1, and a basement layer 24 having a suitable adhesive property to the surface of the transfer-receiving material and formed of the different material from a material of the uppermost layer 26. Depending on the material of the uppermost layer 26 and the basement layer 24, there are some cases that the these layers are difficult to adhere each other directly, or there is not enough adhesive property between them. In this case, an intermediate layer 25 may be arranged, which is formed of the material adhering firmly to both of the basement layer 24 and the uppermost layer 26. Further, to facilitate transferring the adhesive layer 27, a release layer 23 may be arranged on the substrate sheet 22.

To develop a sliding property between an adhesive layer transfer sheet 21 and a heating device such as a thermal head, a back surface layer(not shown) may be arranged on an opposite surface of a substrate sheet 22 to a surface on which an adhesive layer 27 is arranged.

A basement layer 24 and an uppermost layer 26 composed of the adhesive layer 27, arranged such that the uppermost layer 26 directly adhere to a transfer layer 9, and the basement layer 24 directly adhere to a transfer-receiving material. That is, when the adhesive layer 27 first transfers on the transfer layer 9, shown in FIG. 2, the uppermost layer 26 is arranged at the farthest position from the substrate sheet 22 of the adhesive layer transfer sheet, and the basement layer 24 is arranged at the closest position to the substrate sheet 22. The other hand, when the adhesive layer 27 is transferred on the transfer-receiving material first, it is not shown but the basement layer 24 is arranged at the furthest position from the substrate sheet 22 of the adhesive layer transfer sheet, and the uppermost layer 26 is arranged at the closest position to the substrate sheet 22.

Figure 3:
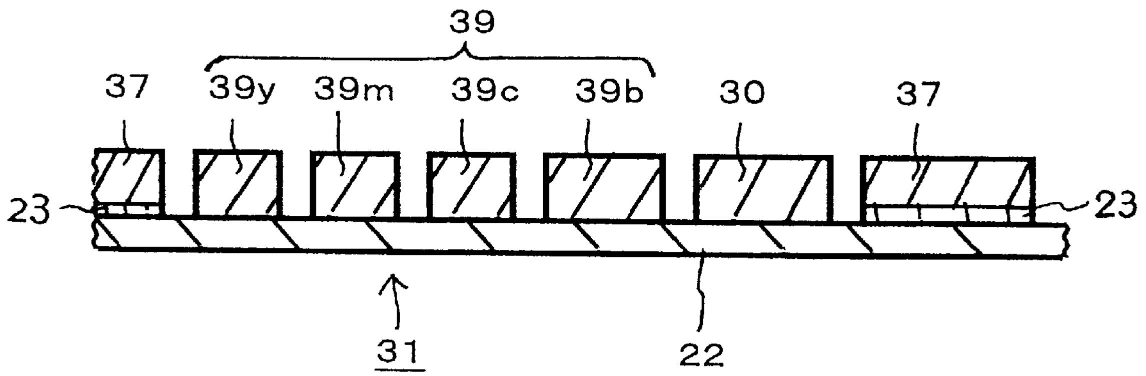
FIG. 3 is a schematically sectional view of the other example of an adhesive layer transfer sheet according to the present invention.

FIG. 3 is a schematic sectional view shown the other example of an adhesive layer transfer sheet which is used for the method of forming the printed product according to the present invention. An adhesive layer transfer sheet 31 is composed such that at least one coloring material layer selected from the group consisting of a sublimation dye layer 39 having various colors and a heat fusible ink layer 30 having various colors, and an adhesive layer 37 are formed so as to laterally arrange them along the surface on a substrate sheet 22. The adhesive layer 37 has the same construction as a construction of the adhesive layer 27, shown in FIG. 2. Since this adhesive layer transfer sheet 31 can form an image and the adhesive layer 37 or the transfer layer 9 in the same transfer step without using a thermal transfer sheet which generally uses to form the image, this method has a superior productivity, and can further reduce defects of transferring.

A sublimation dye layer 39 may composed such that the sublimation dye layer 39 which comprises various color layers such as a yellow layer 39Y, a magenta layer 39M, a cyan layer 39C, and a black layer **39*b* are formed so as to laterally arrange them along a surface. A heat fusible ink layer 30 may also composed such that the sublimation dye layer 39 which comprises various color layers is formed so as to laterally arrange them along a surface. The sublimation dye layer 39 and the heat fusible ink layer 30 may be selected and arranged in accordance with the images which should be transferred on the transfer layer 9 of the intermediate transfer recording medium 1, as the occasion demands. Thus it is not limited to a structure shown in FIG. 3. For example, images which are transferred and formed from the sublimation dye layer 39 have a excellent gradation property, and the images which are transferred and formed from the layer consisting of the heat fusible ink of the heat fusible ink layer 30** can be readable by means of OCR. Since each of them has such a character, it can be selected and arranged as the occasion demands.

Figure 4:
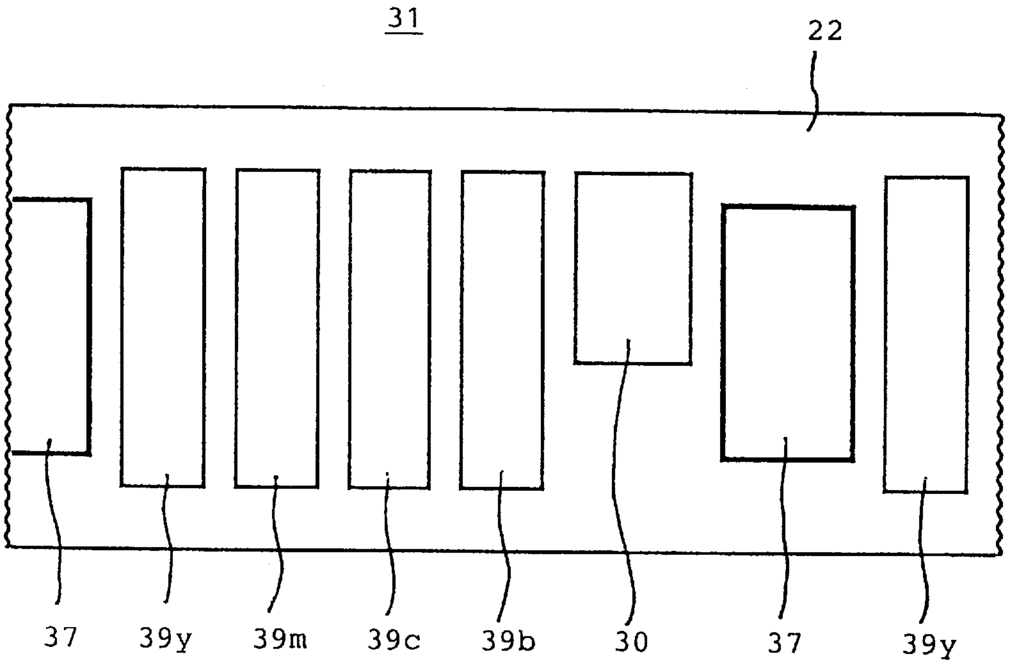
FIG. 4 is a schematically plan view of the other example of an adhesive layer transfer sheet according to the present invention.

FIG. 4 is a schematic plan view of the other example of an adhesive layer transfer sheet according to the present invention.

In the adhesive layer transfer sheet 31, a sublimation dye layer 39 and a heat fusible ink layer 30, which are formed so as to laterally arrange them along the surface on the substrate sheet 22, are formed as the plan shape and size to be fitted to each image forming area allotted on the surface of the transfer-receiving material, on which the images are transferred and formed by using the intermediate transfer recording medium, and not to be wasted. Coloring materials such as sublimation dye and heat fusible ink is transferred by mans of a heating device such as thermal head to the required area on the receptor layer of the intermediate transfer recording medium, corresponding to each image forming area allotted on the surface of the transfer-receiving material, then the images are formed. Accordingly, the plan shape and the size of the sublimation dye layers 39*y*, 39*m*, and 39*c*, and the heat fusible ink layer 30 preferably are formed as the plan shape and the size which are fitting to the transferring and forming image area by the dye and the ink. According to this way, unnecessary area become to reduction, so avoiding waste and economy. Particularly, toward the image having the complicated shape such as a flower shape and a star shape, the shapes of the each coloring layer are formed as a comparatively simple shape such as a ring shape and a quadrilateral shape such that these shapes cover the shapes such as the flower shape and the star shape, then it can make the method easy and reduce waste.

An adhesive layer 37, likewise, is formed as the plan shape and the size fitting the receptor layer transfer area on the surface of the transfer-receiving material, to avoid the waste. Further, the plan shape and the size is not always the same plan shape and size as these of the receptor layer. Accordingly, there are some cases that the area of the adhesive layer 37 is smaller than the area of the images forming on the receptor layer. In this case, only the required area in the formed image is transferred on the transfer-receiving material via the adhesive layer 37.

Figure 5:
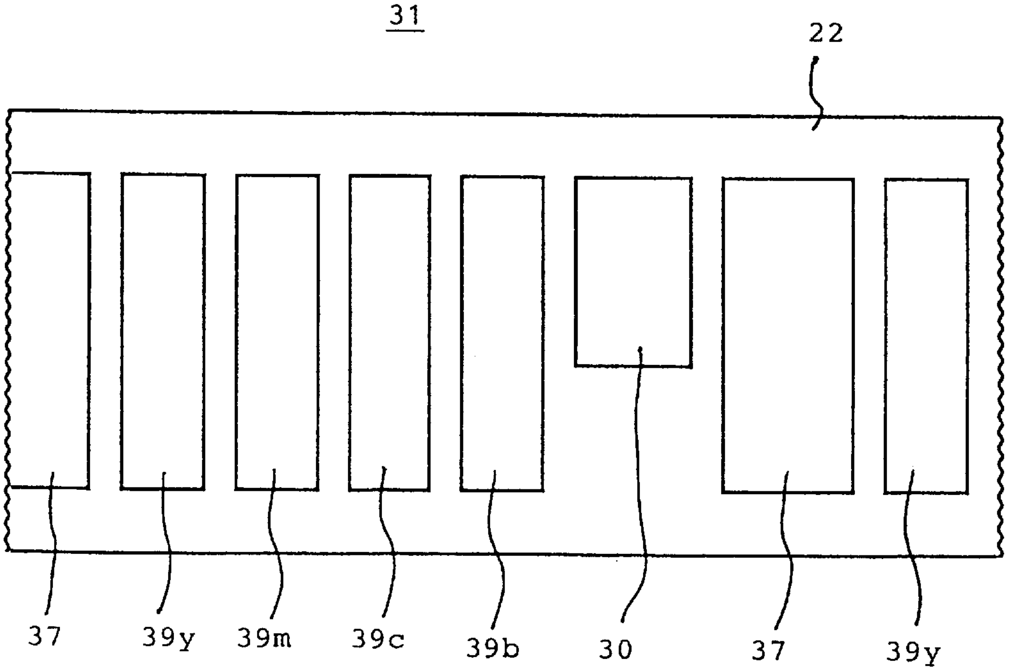
FIG. 5 is a schematically plan view of the other example of an adhesive layer transfer sheet according to the present invention.

Further, as shown in FIG. 5, the area of each coloring layer of the sublimation dye layers 39*y*, 39*m*, and 39*c*, and the heat fusible ink layer 30 may be is formed such that the area is smaller than the area of the adhesive layer 27. According to this method, all of the receptor layer bearing the image by each coloring material layer of the adhesive layer transfer sheet 31 can be transferred on the transfer-receiving material thoroughly. Since the redundant part of the sublimation dye layers 39*y*, 39*m*, and 39*c*, and the heat fusible ink layer 30, thus, can be reduced, it avoid waste and is effective to the cost reduction.

Figure 6:
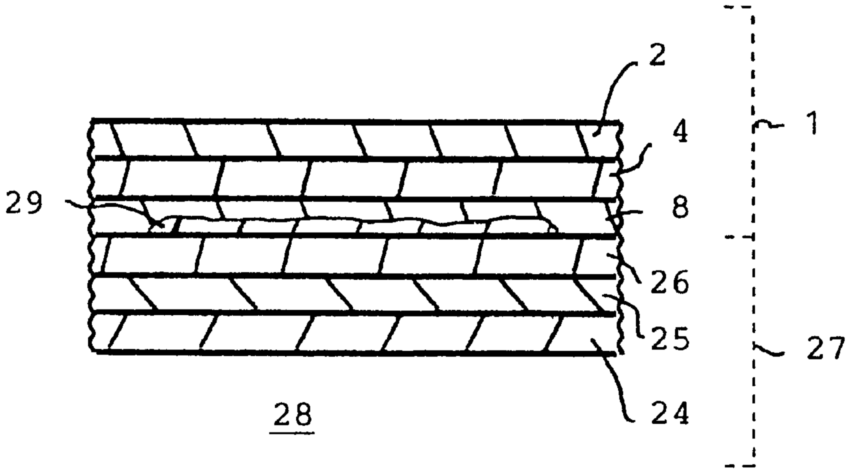
FIG. 6 is a schematically sectional view of one example of an intermediate transfer recording medium after transferred an adhesive layer.

FIG. 6 is a schematic sectional view showing one example of an intermediate transfer recording medium (hereinafter referred as "intermediate laminate sheet 28") after an adhesive layer 27 is transferred. An adhesive layer 27 of an adhesive layer transfer sheet 21 is transferred on a receptor layer 8 of an intermediate transfer recording medium 1, on which an image 29 is formed in advance. The other hand, to the intermediate transfer recording medium 1 on which an image 29 is not formed in advance, through use of the adhesive layer transfer sheet 21 shown in FIG. 2, first, the sublimation dye layers of various color layers of a yellow layer 39Y, a magenta layer 39M, a cyan layer 39C, and black 39*b* are transferred in order, then the heat fusible ink layer 30 is transferred. According to this steps, the image 29 is formed on the receptor layer 8, and after that the adhesive layer 27 is continuously transferred on the receptor layer 8. In all these cases, the uppermost layer 26 in the adhesive layer 27 is directly adhered with the receptor layer 8. The basement layer 24 easily separating from the release layer 23 of the adhesive layer transfer sheet 21 is positioned at the outermost surface of the intermediate laminate sheet 28 after the adhesive layer 27 is transferred. The image 29 of this case is formed such that the image 29 has the mirror image relation with the image recognized by means of a visual observation, an OCR reading device, and the like, after finally the image has transferred on the transfer-receiving material.

Figure 7:
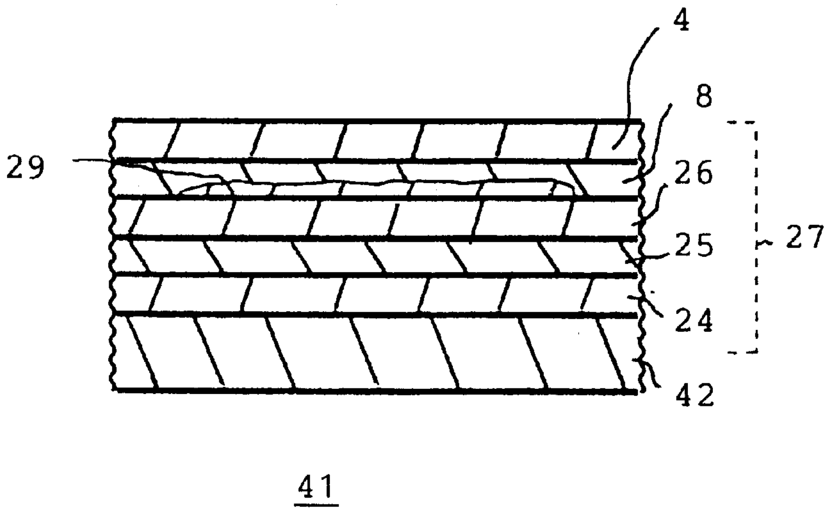
FIG. 7 is a schematically sectional view of one example of a printed product according to the present invention, obtained through thermal transferring an intermediate transfer recording medium with an adhesive layer.

FIG. 7 is a schematic sectional view showing one example of the printed product 41 according to the present invention, obtained by thermal-transferring the intermediate laminate sheet 28. The intermediate laminate sheet 28 on which the adhesive layer 27 is transferred from the adhesive layer transfer sheet 21 is transferred such that, when the receptor layer 8 bearing the image 29 is transferred on the transfer-receiving material 42, the substrate sheet 22 is separated from the protecting layer 4, then the basement layer 24 directly adhere with the transfer-receiving material 42. In thus obtained printed product 41, adhesion between the receptor layer 8 bearing the image 29 and the transfer-receiving material 42 become firm by the adhesive layer 27. Accordingly, the defects of transferring do not occur, and separating does not occur subsequent using.

All of above-mentioned transferring is conducted through use of a heating device of such as a thermal head. The composition of the intermediate transfer recording medium 1 is not limited by showing in FIG. 4, and can be used the composition published until now.

In accordance with the adhesive layer transfer sheet 21, 31 according to this invention, since the uppermost layer 26 in the adhesive layer 27 has a suitable adhesive property with the receptor layer 8 of the intermediate transfer recording medium 1, the adhesive layer 27 firmly adhering on the receptor layer 8 of the intermediate transfer recording medium 1, and not occurring the problem of deterioration by time passing. As a result, the intermediate transfer recording medium with the adhere layer (the intermediate laminate sheet 28) can be obtained. In this time, on the surface of thus obtained intermediate transfer recording medium, the basement layer 24 having the suitable adhesive property with the surface of the transfer-receiving material, in the adhesive layer 27, is positioned, and so the receptor layer 8 of the intermediate transfer recording medium can be transferred with a firm adhesion on the transfer-receiving material 42 through the basement layer 24 having an adhesive property firmly with the transfer-receiving material 42 and not to occur deterioration along time passing. Hence, the adhesive transfer sheet according to the present invention can firmly connect the receptor layer 8 on the transfer-receiving material 42, in case that the enough adhesion can not be obtained with both of the receptor layer 8 of the intermediate transfer recording medium and the transfer-receiving material 42 through the adhesive layer composed single material.

On the substrate sheet 22, the sublimation dye layer 39 and/or the heat fusible ink layer 30 in order to form the adhesive layer 27 and the image 29 formed so as to laterally arrange them along the surface on the substrate sheet 22, is arranged. Accordingly, just before the adhesive layer 27 is transferred on the receptor layer 8 of the intermediate transfer recording medium 1, color images and letters is transferred and formed on the receptor layer 8, further the adhesive layer 27 can be transferred and formed by a series of a continues step. As a result, the process for forming the image can be reduced, and the cost can be reduced.

According to the printed product 41 of the present invention, the receptor layer 8 bearing the image 29 has an excellent adhesive property with the uppermost layer 26 in the adhesion layer 27, and the transfer-receiving material 42 has an excellent adhesive property with the basement layer 24 in the adhesive layer 27. Hence, regardless of the material of the transfer-receiving material 42 and so on, the receptor layer 8 can be arranged firmly on the transfer-receiving material 42. Accordingly, the printed product 41 on which defects of transferring and separation of the image do not occur, can be obtained. Further, when a passport paper with identification column is used as the transfer-receiving material 42, the receptor layer 8 bearing the image 29 is arranged with firm adhesion. Accordingly, on such a passport, for example, the image 29 such as a picture of one's face and identification matter do not chipped, and the receptor layer 8 is not separated.

Figure 8:
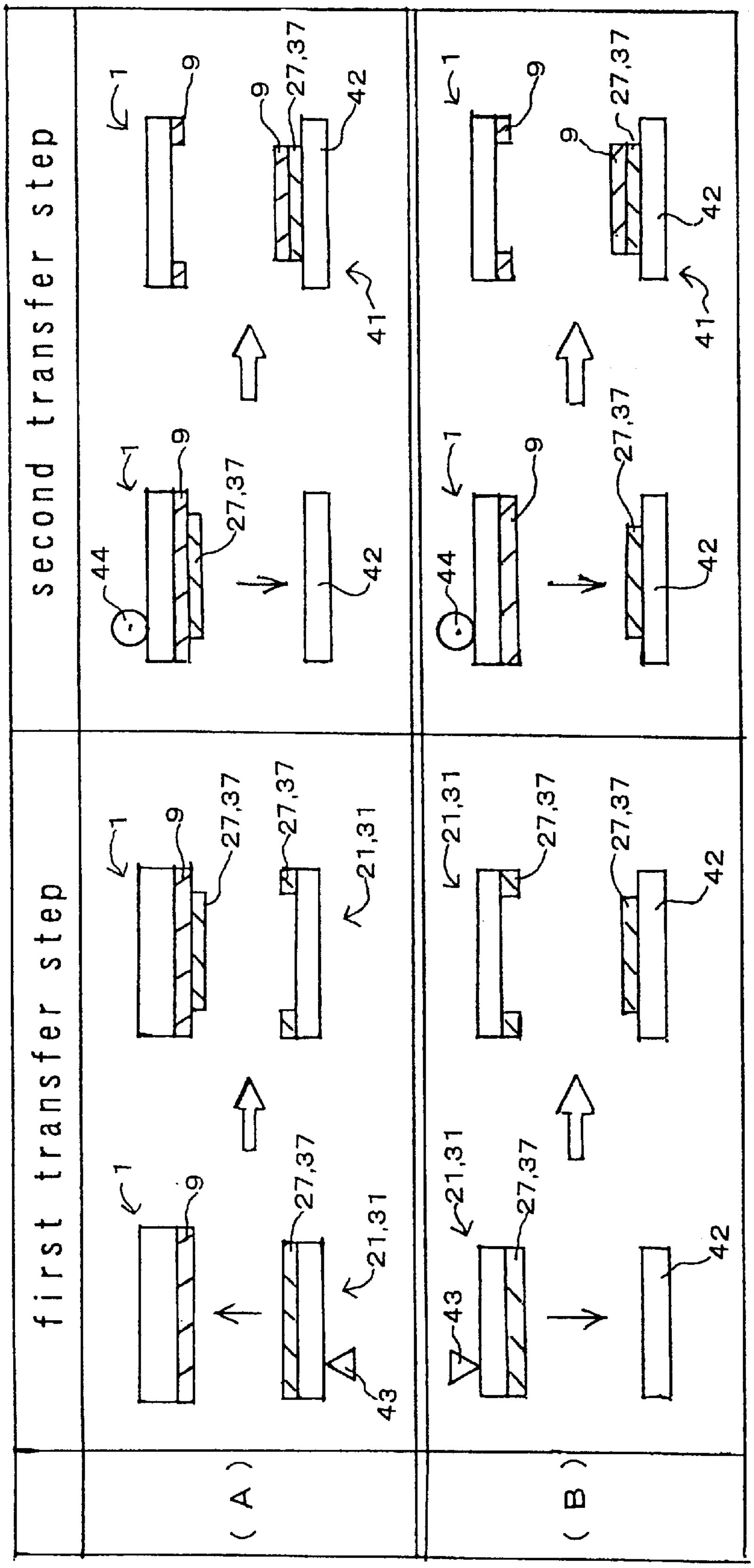
FIG. 8 is a schematic view of one example of a method of forming a printed product according to the present invention.

Next, a method for forming a printed product according to the present invention is illustrated with referring FIG. 8 of a schematic view.

The method for forming the printed material at least compose of two transfer step of a first transfer step and a second transfer step. In the first transfer step, the adhesive layer 27, 37 of the adhesive layer transfer sheet 21, 31 is transferred on either one of the transfer layer 9 on which the image has been formed in advance, or the transfer receiving material 42. In the second transfer step, the transfer layer 9 on which the adhesive layer 27, 37 Is transferred on the transfer-receiving material 42 on which the adhesive layer 27, 37 is not transferred, or the transfer layer 9 on which the adhesive layer 27, 37 is not transferred is transferred on the transfer-receiving material 42 on which the adhesive layer 27, 37 is transferred.

In the first transfer step showing in FIG. 8(A), first, the adhesive layer 27, 37 of the adhesive layer transfer sheet 21, 31 is transferred on the transfer layer 9 of the intermediate transfer recording medium 1. Accordingly, the adhesive layer transfer sheet 21, 31 in which the uppermost layer 26 is arranged at the furthest position from the substrate sheet 22, and the basement layer 24 is arranged at the closest position from the substrate sheet 22. is prepared. The transfer is conducted by a thermal transfer method using a heating device generally such as a thermal head 43. The roller transfer method also can be used. In this method, a roller 44 which can add the heat and pressure is used. When the transfer conducts through use of thermal head 43, only heating portion can transfer, and so the adhesive layer 27, 37 having a pattern can be pattern-transferred on the transfer layer 9. Accordingly, this method is preferably used. The other hand, when the transfer conducts by the roller transfer method, since the adhesive layer 27, 37 can be transferred all over on the transfer layer 9, the transfer can conduct efficiency, and the productivity is increased. On the outermost surface of the adhesive layer 27, 37, the uppermost layer 26 having the adhesive property suitable to the transfer layer 9, is arranged. Accordingly, the adhesive layer 27, 37 firmly adhere on the transfer layer 9. Hence, the defects of the separation and transferring in the transfer step do not occur.

In case, the adhesive layer transfer sheet 21 on which the coloring material layer is not arranged, is used, before transferring the adhesive layer 27, the image is formed on the transfer layer 9 through use of the thermal transfer sheet using generally. The other hand, in case, the adhesive layer transfer sheet 31 on which the coloring material layer is arranged, is used, just before transferring the adhesive layer 37 on the transfer layer 9, the image can be formed on the transfer layer. Accordingly, the image and the adhesive layer 37 can be arranged by a series of transferring process effectively, and so it is preferable from the point of reducing the process and cost.

In the subsequently conducting second transfer step shown in FIG. 8 (A), the transfer layer 9 on which the adhesive layer 27, 37 is transferred, is transferred on the transfer-receiving material 42, then the print product 41 is formed. Generally, transferring is conducted by means of roller transfer method. The thermal transfer method using a heating device such as a thermal head 43 also can be used. When an adhesive layer 27, 37 is pattern-transferred on the transfer layer 9, the transfer layer 9 having the same pattern as the transfer-pattern of the adhesive layer 27, 37, can be transferred on the transfer-receiving material 42 through use of the roller transfer method having the excellent productivity. In the intermediate transfer recording medium on which the adhesive layer 27, 37 is transferred, the basement layer 24 having an adhesive property suitable for the transfer-receiving material 42 is arranged on the outermost surface facing each other to transfer-receiving material 42. Accordingly, the transfer layer 9 firmly adhere on the transfer-receiving material 42 through via adhesive layer 27, 37. Thus, the defects of separation and transferring do not occur in the transferring process, and the excellent quality of the print product 41 can be formed.

The other side, in the first transfer step showing in FIG. 8(B), first, the adhesive layer 27 of the adhesive layer transfer sheet 21 is transferred on the transfer-receiving material 42. Accordingly, the adhesive layer transfer sheet 21 in which the basement layer 24 is arranged at the farthest position from the substrate sheet 22, and the uppermost layer 26 is arranged at the closest position from the substrate sheet 22, is prepared. In the same way as the above mentioned transfer step shown in FIG. 8(A), the transferring is conducted by the thermal transfer method using a heating device such as a thermal head, generally. The roller transfer method in which a roller 44 can add heat and pressure, also can be used. When the transfer conducts through use of thermal head 43, only the heating portion can be transferred, and so the adhesive layer 27 having a pattern can be pattern-transferred on the transfer-receiving material 42. Accordingly, this method is preferably used. The other hand, when the transfer conducts by the roller transfer method, since the adhesive layer 27 can be transferred all over on the transfer-receiving material 42, the transfer can conduct efficiency, and the productivity is increased. On the outermost surface of the adhesive layer 27, the basement layer 24 having the adhesive property suitable for the transfer-receiving material 42, is arranged. Accordingly, the adhesive layer 27 firmly adhere on the transfer-receiving material 42. Hence, the defects of the separation and transferring do not occur in the transferring process. In the transfer process showing in FIG. 8(B), first, the adhesive layer 27 is transferred on the transfer-receiving material 42, thus, the adhesive layer transfer sheet 21 in which the coloring material layer is not arranged, is used.

In the subsequently conducting second transferring step showing in FIG. 8 (B), the transfer layer 9 is transferred from the intermediate transfer recording medium 1 on the transfer-receiving material 42 on which the adhesive layer 27 is transferred, and then the printed product 41 is formed. In the transfer layer 9, the image has been formed in advance by means of the thermal transfer sheet using generally. The transferring of the transfer layer 9 is generally conduct by a roller transfer method. The thermal transfer method in which a heating device such as a thermal head 43 is used, also can be used. When the adhesive layer 27 is pattern-transferred on the transfer-receiving material 42, the transfer layer 9 having the same pattern as the transfer-pattern of the adhesive layer 27, can be transferred on the transfer-receiving material 42 by means of the roller transfer method having the superior productivity. In the transfer-receiving material 42 on which the adhesive layer 27 is transferred, the uppermost layer 26 having the adhesive property suitable for the transfer layer 9 is arranged on the outermost surface facing to the transfer layer 9 of the intermediate transfer recording medium 1. Accordingly, the transfer layer 9 is firmly adhered on the transfer-receiving material 42 trough via the adhesive layer 27. Thus, the defects of separation and transferring do not occur in the transfer process, and the excellent quality of the print product 41 can be obtained.

Such as illustrating above, since the adhesive layer 27, 37 of the adhesive layer transfer sheet 21, 31 is transferred either on the transfer layer 9 of the intermediate transfer recording medium 1, or on the transfer-receiving material 42 after that transferred on another one, in accordance with the shape of the transfer-receiving material and so on, the efficient method for forming the printed product can be selected.

According to above described method for forming the printed product 41, the transfer layer 9 bearing the image has excellent adhesive property with the uppermost layer 26 in the adhesive layer 27, 37, and the transfer-receiving material 42 has excellent adhesive property with the basement layer 24 in the adhesive layer 27, 37. Thus, regardless of the material of the transfer-receiving material 42 and so on, the transfer layer 9 can be firmly arranged on the transfer-receiving material 42. Hence, the printed product 41 in which the defects of the transfer and image separation do not occur, can be obtained. When the passport paper with the identification column is used as the transfer-receiving material 42, since the transfer layer 9 bearing the image is arranged with the excellent adhesive property, for example, a passport in which chipping the image such as the picture of one's face and the identification matter and separating the transfer layer do not occur, can be obtained.

Each layer composed of an adhesive layer transfer sheet 21, 31 using in this invention will be sequentially illustrated in the following.

[Substrate Sheet]

In the present invention, a substrate sheet 22 conventionally used for a thermal transfer film can be utilized as it. There is no specific limitation to the base film 2 for the present invention. As preferred examples of materials of the substrate sheet 22, there will be listed up the following materials: thin papers such as glassine paper, condenser paper or paraffin paper; polyesters having a high heat-resistance property such as polyethlene terephthalate, polyethylene naphthalate, polybutylene terephthalate, polyphenylene sulfide, polyether ketone, or polyether sulphone; plastic distraction or non- distraction film made of polypropylene, polycarbonate, cellulose acetate, polyethylene derivatives, polyvinyl chloride, polyvinylidene chloride, polystyrene, polyamide, polyimide, polymethylpentene, ionomers. The laminated film in which two or more sorts of these materials is laminated can be used. The thickness of the substrate sheet 22 may be changed in accordance with the material to be used so as to provide a suitable strength and heat resisting property, and in usual, the use of the substrate sheet 22 having the thickness of about 1 to 100 $\mu$m will be preferred.

[Basement Layer]

A basement layer 24 is made of the material having the excellent adhesive property with the transfer-receiving material 42, and is arranged as a part of an adhesive layer 27, 37 on the adhesive layer transfer sheet 21, 31.

The basement layer 24 is easily separated from a release layer 23 of the adhesive layer transfer sheet 21, 31 and transferred on an intermediate transfer recording medium 1 when the adhesive layer 27 is transferred on the intermediate transfer recording medium 1 from the adhesive layer transfer sheet 21, 31. The basement layer 24 transferred on the intermediate transfer recording medium 1 is positioned on the outermost surface of an intermediate laminate sheet 28, shown in FIG. 6. And when subsequent transferring on the transfer-receiving material 42, the basement layer 24 is born the role of adhering firmly the receptor layer 8 bearing the image 29 with the transfer-receiving material 42 through adhering directly to the transfer-receiving material 42.

Accordingly, the material of the basement layer 24 is selected in accordance with the material and the property to be used as the transfer-receiving material 42. As the materials usually using, such as thermal plasticity synthetic resins, natural resins, rubbers, waxes may be listed. For Example, there will be listed up the following materials: synthetic resins including cellulose derivatives such as ethyl cellulose, or cellulose acetate propionate; styrene copolymers such as polystyrene, or poly $\alpha$-methylstyrene; acrylic resins such as polymethyl methacrylate, polyethyl methacrylate, or polyethyl acrylate; vinyl group resins such as polyvinyl chloride, polyvinyl acetate, vinylchloride-vinylacetate copolymer, or polyvinyl butyral; polyester resins; polyamid resins; epoxy resins; polyurethane resins; ionomers; ethylene-acrylic acid copolymers; ethylene-acrylic esters copolymers: tackifier such as rosin, or rosin modified maleic resin: derivatives of natural resin and synthetic rubber such as ester gum, polyisobutylene rubber, isobutylene-isoprene rubber, styrene-butadiene rubber, butadiene-acrylonitrile rubber, polyamide resin, or polyorefin chloride. The basement layer 24 is the composition formed of one or more sorts of the above described materials, preferably uses the material which expresses the adhesive property by heating.

When the transfer-receiving material 42 is a passport paper with an identification column, and the material is nature paper having the smoothness within the range of 10–1500 seconds by Bec's smoothness, preferably ionomer, polyvinyl pyrrolidone, and polyamide are listed up for the material using as the basement layer 24,. The other hand, when coat paper, resin impregnated paper, or resin coat paper is used as the transfer-receiving material 42, the material using as the basement layer 24, may be used vinylchloride-vinylacetate copolymer. For developing the property of sharpness of edge, moisture-resisting pigments may be added.

The basement layer 24 can be formed as follow. The coating solution for the basement layer is prepared through that the one or more sort of materials are selected from the above described materials in accordance with the material of the transfer-receiving material 42 and so on, and added the addition agent as the occasion demands, then these materials are dispersing or dissolving in the appropriate solvent such as water and organic solvents. Thus obtained coating solution may be coated on the release layer 23 or the intermediate layer 25 by means of the method such as gravure, screen printing, or reverse coating using a gravure plate, and dried. Although, a thickness of the basement layer is decided in accordance with the adhesive property to the transfer-receiving material 42 and receptor layer 8 via the adhesive layer 27, and the operational property, it is preferred for the basement layer to have a thickness of about 0.5 to 20 μm.

[Uppermost layer]

The uppermost layer 26 is formed of the material having the excellent adhesive property to the receptor layer 8, positioned the outermost surface of the adhesive layer 27 on the adhesive layer transfer sheet 21, 31, and as a part thereof. The uppermost layer 26 has a role of firmly adhering to the receptor layer 8 bearing the image 29 already, when the adhesive layer 27 is transferred on the intermediate transfer recording medium 1 from the adhesive layer transfer sheet 21, 31.

The uppermost layer 26 transferred on the intermediate transfer recording medium 1 is positioned about middle of the intermediate laminate sheet 28 showing in FIG. 6, and then when transferring on the transfer-receiving material 42, the uppermost layer 26 is transferred on the transfer-receiving material 42 with the receptor layer 8, and the like.

Accordingly, the material formed of the uppermost layer 26 is selected in accordance with the material and property of the receptor layer 8. As the general composing material, the similar material which is listed as the material used for basement layer 24, can be used. In these material, it is preferable to use one or more sorts of synthetic resins including: acrylic resins such as polymethyl methacrylate, polyethyl methacrylate, polyethyl acrylate, or acrylic polyol; vinyl group resins such as polyvinyl chloride, polyvinyl acetate, vinylchloride-vinylacetate copolymer, polyvinyl butyral; polyester resins; polyamid resins: epoxy resins; polyurethane resins; ethylene-acrylic acid copolymers; ethylene-acrylic esters copolymers.

Further, it is preferable that the glass-transition temperature of the resin formed of the uppermost layer 26 is not less than 60° C. Accordingly, when the adhesive layer transfer sheet 21, 31 keep under the condition which the adhesive layer transfer sheet is rolled up, or pile up, especially under bad condition such as high temperature during keeping, the blocking, that is the uppermost layer stick to the back surface of the substrate sheet, can prevent.

When the receptor layer 8 is formed of vinylchloride-vinylacetate copolymer resin, as the material formed of the uppermost layer 26, vinylchloride-vinylacetate copolymer as same, polyester resin, or acrylic resin can be preferably listed. According to adopting these materials, the uppermost layer 26 can obtain the preferable firm adhesive property.

The uppermost layer 26 can be formed as follow. The coating solution for forming the uppermost layer 26 is prepared through that the one or more sorts of materials are selected from the above described materials in accordance with the material formed of the receptor layer 8, and added the addition agent and the like as the occasion demands, then these materials are dispersing or dissolving in the appropriate solvent such as water and organic solvents. Thus obtained coating solution may be coated on the intermediate layer 25 by means of the method such as gravure, screen printing, reverse coating using a gravure plate, and dried. Although, a thickness of the uppermost layer is decided in accordance with the adhesive property to the transfer-receiving material 42 and the receptor layer 8 via the adhesive layer 27, and the operational property, it is preferred for the uppermost layer to have a thickness of about 1.0 to 20 μm under dry condition.

[Intermediate Layer]

The intermediate layer 25 is arranged, as the occasion demands, to integrate the basement layer 24 and uppermost layer 26. That is, the above mentioned materials formed of the basement layer 24 and the uppermost layer 26 is changed in accordance with the materials formed of the transfer-receiving layer 42 and the receptor layer 8 targeted respectively. Thus, when the basement layer 24 and uppermost layer 26 is piled up, depending on the materials, it is difficult to adhere directly or there is not enough adhesive property. In such case, it is preferable that the intermediate layer 25 is formed of the material which have the adhesive property to adhere firmly to both of basement layer 24 and the uppermost layer 26. In case there is satisfactory adhesive property between the basement layer 24 and the uppermost layer 26, the intermediate layer 25 is not always necessary.

When the material formed of the basement layer 24 is ionomer, and the material formed of the uppermost layer 26 is selected from the synthetic resins including: acrylic resins such as polymethyl methacrylate, polyethyl methacrylate, or polyethyl acrylate; vinyl group resins such as polyvinyl chloride, polyvinyl acetate, or vinylchloride-vinylacetate copolymer; polyester resins; epoxy resins; polyurethane resins; ethylene- acrylic acid copolymer; and ethylene-acrylic ester copolymer, the material formed of the intermediate layer 25 is preferably selected from the materials such as polyvinyl pyrrolidone, polyamide resin, acrylic polyol, or polyvinyl butyral.

Further, in case the material formed of the basement layer 24 is selected from the materials such as polyvinyl pyrrolidone, polyamide, or acrylic polyol, and the material formed of the uppermost layer 26 is selected from the synthetic resins including: acrylic resins such as polymethyl methacrylate, polyethyl methacrylate, polyethyl acrylate; vinyl group resins such as polyvinyl chloride, polyvinyl acetate, vinylchloride-vinylacetate copolymer; polyester resins; polyamide resins; epoxy resins; polyurethane resins; ethylene-acrylic acid copolymer; and ethylene-acrylic ester copolymer, since there is the sufficient adhesive property between the basement layer 24 and the uppermost layer 26, the intermediate layer 25 is not always required.

The intermediate layer 25 can be formed as follow. The coating solution for forming the intermediate layer 25 is prepared through that the one or more sorts of materials are selected from the above described materials in accordance with the material formed of the basement layer 24 and the uppermost layer 26, and added the addition agent and so on as the occasion demands, then these materials are dispersing or dissolving in the appropriate solvent such as water and organic solvents. Thus obtained coating solution may be coated on the basement layer 24 by means of the method such as gravure, screen printing, and reverse coating using a gravure plate, and dried. The thickness of the intermediate layer 25 is usually within the range of 0.5 to 20 μm under dry condition.

Thus formed intermediate layer 25 has an effect which is the absorption of the unevenness which exists on a surface of the transfer-receiving material 42, other than the effect to develop the adhesive property between the basement layer 24 and the uppermost layer 26. Accordingly, the intermediate layer 25 is effective for developing the adhesive property to the transfer-receiving layer 42 and to the transfer layer 9, which is adhered to the basement layer 24 and the uppermost layer 26 respectively, and also for improving the quality of the finally obtained printed product 41. Further, when the basement layer 24 and the uppermost layer 26 is formed of the material which can adhere under low temperature, since heat-softening and fluidization do not occur on the receptor layer 8 by heating during the thermal-transfer, turbulence of the image born on the receptor layer 8 does not occur. As the material which can adhere at low temperature, for example, polyester reigns, ionomer, and vinylchloride-vinylacetate copolymer can be listed up.

Concerning the total thickness of the adhesive layer 27 comprised the above-mentioned basement layer 24, the uppermost layer 26, and the intermediate layer 25 which is arranged as the occasion demands, regardless of the each thickness, when the smoothness of the surface of the transfer-receiving material is 10–1500 sec. Of Bec's smoothness, the range of the thickness is preferably within 2–60 μm. When the thickness of the adhesive layer is less than 2 μm, there is the problem such that the uniform adhesion to the transfer-receiving layer 42 is not enough, and when the thickness is more than 60 μm, there is the problem such as an unintentional peeling of the layer and defects of a property of edge sharpness, and also a waste.

[Release Layer]

A release layer 23 using the present invention is arranged on the substrate sheet 22 as the occasion demands. According to using this release layer 23, since the basement layer 24 can be separated easily from the interface of the release layer 23, the adhesive layer 27 is transferred easily on the intermediate transfer recording medium 1.

The release layer 23 includes the releasing material and the binder resin. The binder resin is preferably formed of the thermoplastic resin including acrylic group resin such as polymethyl methacrylate, polyethyl methacrylate, polybutyl acrylate; vinyl group resins such as polyvinyl acetate, vinyl chloride-vinyl acetate copolymer, polyvinyl alcohol, polyvinyl butyral; cellulose group resin derivative such as ethyl cellulose, nitro cellulose, cellulose acetate; or thermosetting resins such as unsaturated polyester resin, polyester resins, polyurethane resin and aminoalkyd resin. The releasing material is, for example, various wax; silicone wax; silicone group resin; melamine resin; fluorine resin; fine powder of talc and silica; lubricant such as surface active agent and metallic soap.

The release layer 23 can be formed as follow. The coating solution for forming the release layer is prepared through that the above described resin are dispersing or dissolving in the appropriate solvent. Thus obtained coating solution may be coated on the substrate sheet 22 by means of the method such as gravure, screen printing, or reverse coating using a gravure plate, and dried. The thickness of the release layer 23 is usually within the range of 0.1 to 5 μm under dry condition.

[Sublimation Dye Layer]

The sublimation dye layer 39 is arranged with the adhesive layer 27 and the like so as to laterally arrange them along the surface on the substrate sheet 22 of the adhesive layer transfer sheet 31, in order to transfer the image 29 on the receptor layer 8 of the intermediate transfer recording medium 1 as above described. The image 29 is formed through that the dye in the sublimation dye layer 39 is thermal-transferred on the receptor layer 8 of the intermediate transfer recording medium 1 by means of the heating device such as thermal head. Accordingly, since forming the image 29 and transferring the adhesive layer 27 can conduct within a series of process, it is preferable that the complication of the process can avoid.

This sublimation dye layer 39 is formed of a coating solution including a sublimation dye, a binder resin, and the other optional component.

Any conventionally known sublimation dye can be utilized in the present invention as the sublimation dye, and do not limited especially. As the magenta sublimation dye, the following dyes may be exemplified: MS Red G, Macrolex Red Violet R, Ceres Red 7B, Samaron Red HBSL, Resolin Red F3BS. The following dyes may be exemplified as the yellow sublimation dye: PHORONE BRILLIANT YELLOW-6GL, PTY-52, and MACROLEX YELLOW 6G. As the cyan sublimation dye, the following dyes may be exemplified: KAYASET BLUE 714, Waxoline BULE AP-FW, PHORONE BRILLIANT BLUE S-R, and MS BULE 100.

Any conventionally known binder resin can be utilized in the present invention, and do not limited especially. The following resins may be preferable as a binder resin for the sublimation dye layer: a cellulose resin such as ethyl cellulose, hydroxy ethyl cellulose, ethyl hydroxy cellulose, hydroxypropyl cellulose, methyl cellulose, cellulose acetate, and cellulose acetate butyrate; vinyl group resin such as polyvinyl alcohol, polyvinyl acetate, polyvinyl butyral, polyvinyl acetal, polyvinyl pyrrolidone, or polyacrylic amide; and polyester.

The sublimation dye layer 39 may include any optional component such as organic filler. Any conventionally known material can be utilized as this optional component in the present invention, and do not limited especially.

The coating thickness of the sublimation dye layer 39 is preferably within the range of 0.2 to 3 μm, more preferably whithin the range of 0.3 to 2 μm.

The sublimation dye layer 39 can be formed as follow. The coating solution for forming the sublimation dye layer is prepared through that the above described sublimation dye, the binder resin, and the other optional component are dispersing or dissolving in the appropriate solvent. Thus obtained coating solution may be coated on the substrate sheet 22 by means of the method such as gravure, screen printing, and reverse coating using a gravure plate, and dried.

[Heat Fusible Ink Layer]

The heat fusible ink layer 30 is arranged with the adhesive layer 27 and the like so as to laterally arrange them along the surface on the substrate sheet 22 of the adhesive layer transfer sheet 21, similar to above described the sublimation dye layer 39. The image 29 is formed through that the heat fusible ink layer 30 is thermal-transferred on the receptor layer 8 of the intermediate transfer recording medium 1 by means of a heating device such as a thermal head. Accordingly, since forming the image 29 and transferring the adhesive layer 27 on the intermediate transfer recording medium 1 can conduct within a series of process, it is preferable that the complication of the process can avoid.

This heat fusible ink layer 30 may be formed of the heat fusible ink similar to conventional ink. The heat fusible ink is composed of a coloring material and a vehicle, and various additive agent may be added as the occasion demands.

As a coloring material for the heat fusible ink, it is preferable to use carbon black. Since the carbon black has a satisfactory property as a recording material compared with above all of the organic or inorganic paints or dyes, for example, enough density of coloration, and not to be discoloration and browning through exposure to light, heat and change of temperature, it can be printed a letter or a mark with high density and clearness. Further, when using the heat fusible ink, it is readable OCR reading, and so it is preferably used to form the image which is required OCR reading.

As a vehicle, using any one of the binder resin within the following item 1 to 5 is preferable from the point of the adhesive property to the receptor layer 8 of the intermediate transfer recording medium 1 and scratch-resistance property.

1. acrylic resin
2. acrylic resin+chlorinated rubber
3. acrylic resin+vinyl chloride/vinyl acetate copolymer resin
4. acrylic resin+cellulose resin
5. vinyl chloride rubber/vinyl acetate copolymer resin There may be used wax and the like instead of the above described the binder resin, and the binder resin which is added the wax and the like. As the typical example of the wax, microcrystalline wax, carnauba wax, and paraffin wax can be listed. Further, the material which may be used as wax is listed up as follow: Fischer-Tropsch's wax, various low molecular polyethylene, Japan tallow, bees wax, cetaceum, insect wax, wool wax, shellac wax, candelilla wax, petrolatum, partiallymodified wax, fatty acid ester, and fatty acid amide.

The heat fusible ink layer 30 is formed through use of the coating method such as hot melt coating, hot lacquer coating, gravure coating, gravure reverse coating, or roll coating, and through applying the above described heat fusible ink on the substrate sheet 22. The thickness of the formed heat fusible ink layer is decided by the relation of required density and heat sensitivity, and usually within the range of 0.2 to 10 $\mu$m, preferably.

[Backing Layer]

As occasion demands, a backing layer (not shown) may be formed by a conventional method on the opposite surface of the substrate sheet 22 to the surface on which the adhesive layer 27 is arranged, for the purpose of preventing the adhesive layer 21, 31 from being thermally fused to a heating device such as a thermal head and improving the sliding performance thereof when the adhesive layer 27 and the like is transferred on the intermediate transfer recording medium 1 from the adhesive layer transfer sheet 21, 31.

The backing layer is formed of nature or synthetic resins including; for example, such as cellulose group resin such as ethyl cellulose, hydroxycellulose, hydroxypropyl cellulose, methyl cellulose, cellulose acetate, cellulose acetate butyrate or nitrocellulose; vinyl group resin such as polyvinyl alcohol, polyvinyl acetate, polyvinyl butyral, polyvinyl acetal or polyvinyl pyrrolidone; acrylic group resin such as polymethylmethacrylate, polyethylacrylate, polyacrylamide and acrylonitrile-styrene copolymer; polyamide resin; vinyltoluene resin; coumarone-indene resin; polyester group resin; polyurethane group resin; silicone-modified urethane resin; fluorine-modified urethane resin; and mixture thereof.

For Further improving the heat-resistance property, the backing layer is preferably formed of crosslinking resin by selecting a resin having a reactive group from the above-mentioned resins, and using a crosslinking agent such as polyisocyanate in combination therewith. Furthermore, in order to provide heat-resistively sliding ability for the backing layer and improve sliding ability against the thermal head and so on, solid or liquid releasing agent or lubricant may be added to the backing layer.

As such releasing agent or lubricant, there may be used, for example, various waxes such as polyethylene wax or paraffin wax; higher fatty acid alcohol; organopolysiloxane; anionic group surface active agent; cationic group surface active agent; amphoteric surface active agent; nonionic group surface active agent; fluorine group surface active agent; organic carboxylic acid and its derivative; fluorine group resin; silicone group resin; and fine particles of inorganic compound such as talc or silica. The lubricant is added by an amount of 5 to 50 weight %, preferably 10 to 30 weight %, with respect to all solid component of the backing layer.

m[Detection Mark]

The detection mark(not shown) is preferably arranged to the adhesive layer transfer sheet 21, 31. It is generally used as a positioning mark, for exsample, in order to transfer the adhesive layer 27 to the designated position on the receptor layer 8 of the intermediate transfer recording medium 1 and to transfer the various color of the dye and ink, and adhesive layer 27 and the like on the receptor layer 8, without dislocation of a position and a color.

Further, such a detection mark may be arranged the appropriate portion of the intermediate transfer recording medium 1, described later, and it acts as the positioning mark when transferring on the transfer-receiving material 42.

The shape of the detection mark can be adopted any shapes as long as capable of being detected by a optical detector. The shape thereof is not specifically limited and, for example, round shape, rectangular shape, linear shape, or the like, or the conventional detection mark such as a penetration hole may be adopted. The printed detection mark can be formed by means of the conventional printing method and the like, at a part or plural parts on either surface of the substrate sheet 22 of the adhesive layer transfer sheet 21, 31. In case, the detection mark is formed through printing, the conventional material can be used as the ink to be used, and especially it is not limited.

Next, the intermediate transfer recording medium 1 using to form the printed product 41 according to present invention will be described.

Figure 9:
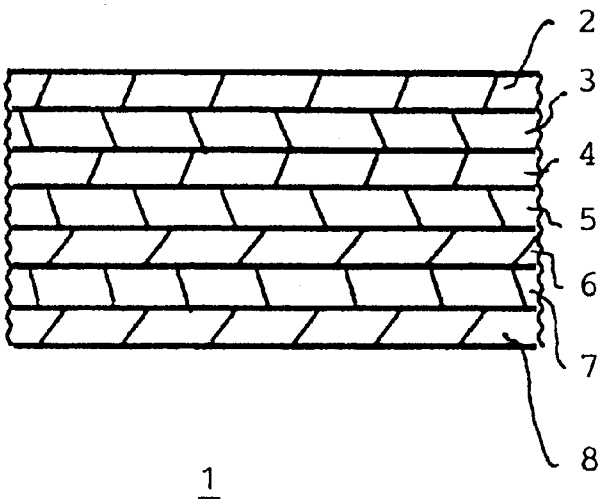
FIG. 9 is a schematically sectional view of the other example of an intermediate transfer recording medium using for forming a printed product according to the present invention.
Figure 10:
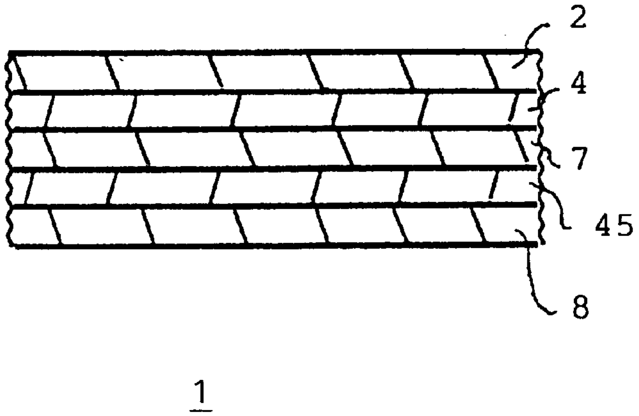
FIG. 10 is a schematically sectional view of the other example of an intermediate transfer recording medium using for forming a printed product according to the present invention.

FIG. 9 and FIG. 10 is showing a schematic sectional view of one exsample of the intermediate transfer recording medium using to form the printed product according to the present invention. In the intermediate transfer recording medium 1, at least a receptor layer 8 is arranged on the base film 2.

The base film 2 can be used the similar material to the material formed of the substrate sheet 22 of the above described the adhesive layer transfer sheet 21, 31. The backing layer (not shown) may be arranged on the opposite surface of the base film 2 to the surface where the receptor layer 8 is arranged, in order to improved the sliding property to the thermal head and the like when transferring on the transfer-receiving material.

On the base film 2, shown in FIG. 9, a separate layer 3, a protecting layer 4, a hologram layer 5, a transparent vapor deposition layer 6, an anchor layer 7, and a receptor layer 8 can be arranged in this order. Further, showing in FIG. 10, on the base film 2, a protecting layer 4, an anchor layer 7, an ultraviolet rays absorption layer 45, a heat seal layer 46, and a receptor layer 8 may be arranged in this order. These layers show well known action and effect, the formation is not limited the formation shown in FIG. 9 and FIG. 10. It is possible to add the other conventional layers.

On the receptor layer 8 arranged on the intermediate transfer recording medium 1, the adhesive layer 27, or an image 29 and the adhesive layer 27 is transferred from the adhesive layer transfer sheet 21, 31 according to this invention. Then, on the surface of the adhesive layer 27 of the intermediate transfer recording medium (intermediate laminate layer 28), on which the image 29 and the adhesive layer 27 is transferred, the basement layer 24 having a suitable adhesive property to the surface of the transfer-receiving material 42 is arranged. Thus, the receptor layer 8 on which the image is formed, is transferred on the transfer-receiving material 42 from the intermediate laminate layer 28 with other necessary layers by mans of the thermal transfer. As a result, the printed product 41 according to the present invention is formed.

The receptor layer 8 is firmly adhered to the transfer-receiving material 42, and hardly separated, because the receptor layer 8 has excellent adhesion property to the uppermost layer transferred simultaneously. Further, Since the receptor layer 8 is formed of the resin material which easily receipt the above described sublimation dye and heat fusible ink, the high quality image having excellent gradation property, can be obtained easily, thus, it is satisfactory to form the picture of one's face for identification, which is required high quality printing, for example, the picture of one's face for a passport and so on.

As the material forming of the receptor layer 8, there may be exemplified as examples of the material: polyolefin resin such as polypropylene; halide resin such as polyvinyl chloride, polyvinylidene chloride; vinyl resin such as polyvinyl acetate vinyl chloride-vinyl acetate copolymer, ethylen- vinyl acetate copolymer, or polyacrylate; polyester resin such as polyethylene terephtharate or polybutylene terephtharate; polystyrene resin; polyamide resin; copolymer of olefin such as ethylene or propylene and another vinyl monomer; cellulose resin such as ionomer, or cellulose diastase; polycarbonate; or a mixture of the substances mentioned above. Especially, vinyl chloride resin, acryl-styrene resin or polyester resin is preferable.

Since the receptor layer 8 is transferred on the transfer-receiving material 42 via the adhesive layer 27, 37 including the basement layer 24 and the uppermost layer 26, thermal-adhesive property of the receptor layer 8 itself is not always required. Accordingly, the receptor layer 8 can be formed of the resin which is hardly softened by heating, for example, polyester or hardening thereof. According to using such a resin, since thermal-softening and fluidization on the receptor layer 8 which is in danger of occurring during the thermal adhesive by means of thermal head 43 or the like, do not occur, turbulence of the image forming on the receptor layer 8 does not generate.

Even if the receptor layer 8 using the ordinary material, turbulence of the image by thermal-softening and fluidization of the receptor layer 8 during the thermal-transfer, can be prevent through that the basement layer 24 and uppermost layer 26 are formed of the material which can adhere at low temperature.

The receptor layer 8 can be formed as follow. The coating solution for forming the receptor layer is prepared through that the one or more sorts of materials are selected from the thermoplastic resins having the satisfactory dyeing property, and added the addition agent as the occasion demands, then these materials are dispersing or dissolving in the appropriate solvent such as water and organic solvents. Thus obtained coating solution may be coated on the base film 2, or when the protecting layer 4 or the like is formed on the substance film 2, thereon, by means of the method such as gravure, screen printing, and reverse coating using a gravure plate, and dried. The thickness of the receptor layer 8 is within the range of about 0.11 to 10 $\mu$m under dry condition.

Concerning the addition agent, generally using plasticizer having from low molecular weight to high molecular weight such as the plasticizer for vinyl chloride resin, such as ester phthalate, phosphate, or polyester plasticizer, may be added as the plasticizer in order to improve the printing sensitivity of the receptor layer 8. The addition agent is preferably added an amount of 0.5 to 30 weight % with respect to the amount of the resin.

When the image 29 is transferred and formed, preferably a release agent is added to the above described resin in order to prevent the heat fusing to the thermal transfer sheet or the adhesive layer transfer sheet 21 according to present invention. The material such as silicone oil, phosphate surface active agent or fluorine compound is utilized, among of which the silicone oil is most preferably utilized. It is further preferable for the release agent to have the addition amount of 0.2 to 30 weight parts with respect to 100 weight parts of the binder resin forming the receptor layer.

A separate layer 3, a protecting layer 4, a hologram layer 5, a transparent vapor deposition layer 6, and an anchor layer 7 shown in FIG. 9, or a protecting layer 4, an anchor layer 7, an ultraviolet rays absorption layer 45, and a heat seal layer 46 shown in FIG. 10 are generally arranged at appropriate position between the base film and the receptor layer 8 in the intermediate transfer recording medium 1, in accordance with the property of each layer. These layers is transferred on the transfer-receiving material 42 through separating from the base film 2 with the receptor layer 8, and composed of the printed product 41

Each of these layers will be briefly described as follow.

The protecting layer 4 is arranged on the intermediate transfer recording medium 1 in advance, and it is the purpose of arranged the protecting layer 4 to protect the receptor layer 8 transferred on the transfer-receiving material 42, and keep the quality of the image 29.

The material forming of the protecting layer 4 may be used the material used for conventional protecting layer. It is preferable to select the resin composition having the appropriate separating property against the base film 2, and after transferred on the transfer-receiving material 42 with the receptor layer 8, having the demanded property as the surface protecting layer of the receptor layer 8, for example, a fingerprint-resistance property.

When, especially, abrasion proof property, chemical-resistance property, or contamination-resistance property is required to the protecting layer 4, ionizing radiation hardening type resin may be used as the material for the protecting layer 4. Further, the material for a protecting layer 4 such as a lubricant in order to improve a paratripsis-resistance property of the image forming material, a surfactant in order to prevent the contamination, an ultraviolet rays absorbing agent in order to improve a weather resistant property, and the antioxidant and so on, may be used. The protecting layer 4 can be formed similar method as the method for the receptor layer 8, and the thickness of the protecting layer 4 is preferably within the range of 0.1 to 10 $\mu$m.

A separate layer 3 is arranged in order to easily transfer each layer to be transferred on the transfer-receiving material 42. For example, when the separate layer 3 is arranged on the base film 2 shown in FIG. 9, the separate layer 3 can separate easily from the base film 2 at the interface thereof, and can transfer easily the other layers, that is, the protecting layer 4, the hologram layer 5, the transparent vapor deposition layer 6, the anchor layer 7, and receptor layer 8.

The material in order to form the separate layer 3 may be used the conventional material, and not limited.

Trough using the intermediate transfer recording medium 1 on which the hologram layer 5 is arranged, there can be obtained the printed product having the hologram pattern.

Such a printed product on which the hologram pattern is arranged, may be used as a credit card and a passport besides use for decoration, because it is difficult to forge by a reproduction.

As the material for forming of the hologram layer 5, the conventional material can be used, and not limited. And a method for forming the hologram layer 5 may adopt the conventional method.

A transparent vapor deposition layer 6 is generally arranged the side of the receptor layer 8 contacting the hologram layer 5. This transparent vapor deposition layer 6 has different refractive index from the other layers, so that, in the formed printed product 41, this layer has an action such as rising the pattern of the hologram.

The material for forming the transparent vapor deposition layer 6 can be used a conventional material, for example, metallic sulfide or metallic oxide such as ZnS, $TiO_2$, $SiO_2$, or $Cr_2O_3$, and it is not limited especially. Further, a method for forming can be adopt the conventional method such as vapor deposition, sputtering, or ion plating.

An anchor layer 7, for example in FIG. 9, arranged in order to adhere the receptor layer 8 with the hologram layer 5 on which the transparent vapor deposition layer 6 is formed, in FIG. 10, in order to adhere the ultraviolet rays absorbing layer 45 with the protecting layer 4.

The material to form the anchor layer 7 can be used conventional material, and it is not limited. Further, a method to form also adopt the conventional method.

An ultraviolet rays absorbing layer 45 is arranged at an appropriate position between the receptor layer 8 and the base film 2, in order to prevent deterioration of the image 29 of the printed product 41 from an ultraviolet rays in natural light.

The material to form the ultraviolet rays absorbing layer 45 can be used conventional material, and it is not limited. Further, a method to form also adopt the conventional method.

Next, there will be explained concerning a transfer-receiving material. On the transfer-receiving material 42, each layer such as the receptor layer 8 bearing the image 29 and above described the other required layers is transferred from the intermediate laminate sheet, as a result, the printed product 41 is constructed.

A transfer-receiving material 42 used in this invention is not limited especially, and for example, every materials such as a natural fiber paper, a coat paper, a tracing paper, a plastic film which is not deformed through heating during the transfer, a glass, a metal, a ceramics, a wood, a cloth and so on may be used. Concerning the shape and the use, almost sorts may be adopted, for example: gold notes such as a stock, a bill, a bond, bankbooks, a train ticket, horses and vehicles ticket, a revenue stamp, a postage stamp, an appreciation ticket, an admission ticket, a ticket; cards such as a cash card, a credit card, a prepaid card, a member's card, a greeting card, a postal card, a visiting card, a driver's license, an IC card, a light card; cases such as a carton, a container; bags; records; personal ornaments such as an envelope, a tag, an OPH sheet, a slide film, a book mark, a calendar, a poster, a pamphlet, a menu, a passport, POP things, a coaster, a display, a nameplate, a keyboard, a cosmetic, a watch, a lighter; stationery such as writing materials, a report paper; building materials; a panel; an emblem; a key; cloth; clothing; shoes; devices such as a radio, a television, a calculator, OA apparatus; various sample books; an album; output of computer graphics; medical treatment image output and the like may be listed.

Particularly, when a full color picture of one's face and the other required matter are transferred on the passport which is demanded the image of high resolution and high quality, the adhesive layer transfer sheet 21, 31 and the intermediate laminate sheet 28 shown in FIG. 6 are preferably used. As a passport paper, a nature paper is generally used, and in same cases, the quality such as smoothness is varied in accordance with the country. Even when the paper have the Bec's smoothness of 10 to 1500 seconds, the basement layer 24 can firmly adhere, and even when the smoothness is worse than above case, since the basement layer 24 and the intermediate layer 25 formed as the occasion demands perform a role as a buffer layer, the printed product 41 in which quality of the image is excellent, and lacking and separating the image do not occur, can be obtained.

The printed product 41 according to the present invention can be formed through use of the above described adhesive layer transfer sheet 21, 31 and the intermediate transfer recording medium 1. The method to form the printed product will be described as follow.

The printed product 41 according to the present invention can be obtained through that the image 29 is formed on the transfer-receiving material 42 by transferring the receptor layer 8 bearing the image 29 on the transfer-receiving material 42 from the intermediate transfer recording medium 1 by means of using the adhesive layer transfer sheet 21, 31.

That is, the adhesive layer transfer sheet 21, 31 is transferred on the receptor layer 8 of the intermediate transfer recording medium 1 which is used for transferring the receptor layer 8 bearing the image 29 on the transfer-receiving material 42, such that the uppermost layer 26 of the adhesive layer 27 is adhered to the receptor layer 8. And the intermediate transfer recording medium 1 (Intermediate laminate sheet 28) on the outermost surface of which the basement layer 24 is arranged through transferring the adhesive layer 27, is transferred on the transfer-receiving material 42. Then the printed product 41 is formed through that the image 29 is formed on the transfer-receiving material 42.

The adhesive layer transfer sheet 21, 31, the intermediate transfer recording medium 1 and the transfer-receiving material 42 used in this case, is used what is formed by above described material and method.

In case the adhesive layer transfer sheet 21, in which the sublimation dye layer 39 and/or the heat fusible ink layer 30 is arranged with the adhesive layer 27 so as to laterally arrange them along a surface of the substrate sheet 22, is used, color images, letters and the adhesive layer 27 can be transferred and formed on a series of continuous process when the adhesive layer 27 is transferred from the adhesive layer transfer sheet 21 on the receptor layer 8 of the intermediate transfer recording medium 1. Accordingly, since there is no requirement which have to conduct the separate process for forming the image, the process can be reduced, and it is especially suitable for cost.

The receptor layer 8 on which the image 29 is formed and the transfer-receiving material 42 is firmly adhered by means of the uppermost layer 26 and the basement layer 24 having the suitable adhesive property to respective layer. Accordingly, in the forming process of the printed product 41, defects of the adhesion between the receptor layer 8 and the transfer-receiving material 42 do not occur. In the printed product after forming, the separation of the receptor layer 8 and lack of the image 29 do not occur. According to this method, the printed product 41 which hates the lack of the images, such as a passport, an ID card, a credit card, or an identification card can be formed preferably.

Among these printed products, a passport will be described.

Figure 11:
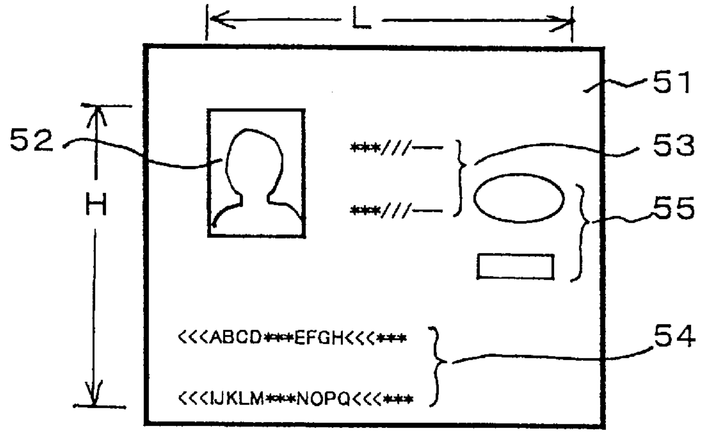
FIG. 11 is a schematically plan view of one example of an identification column of a passport forming by the method for forming an image according to the present invention.
Figure 11:
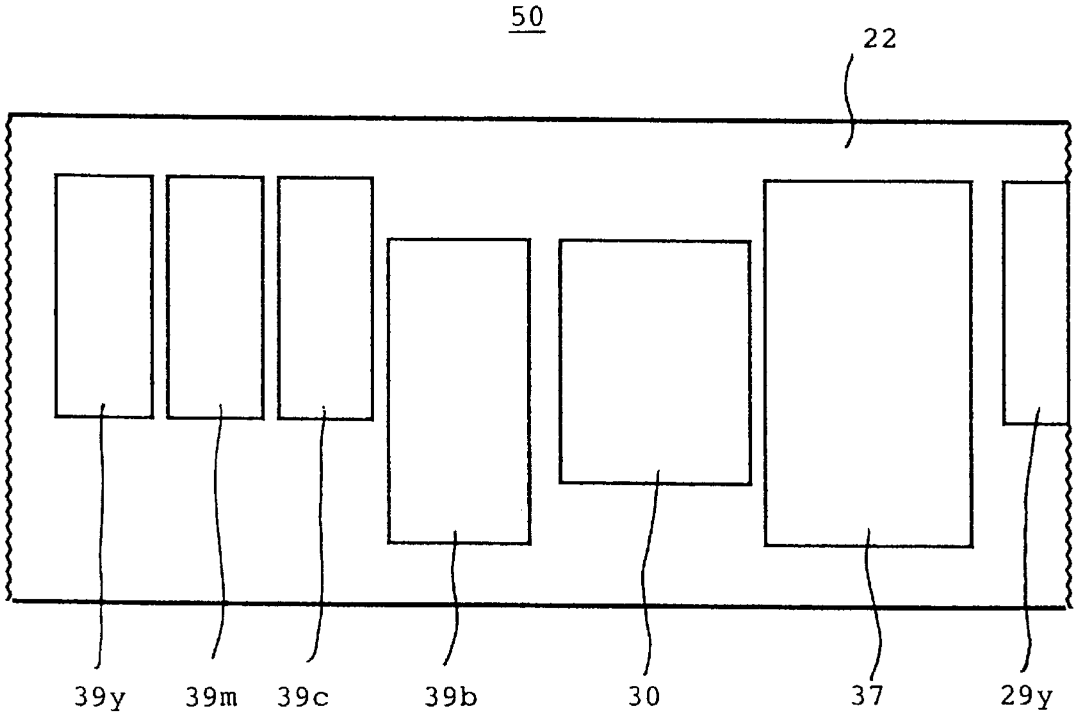
Figure 12:
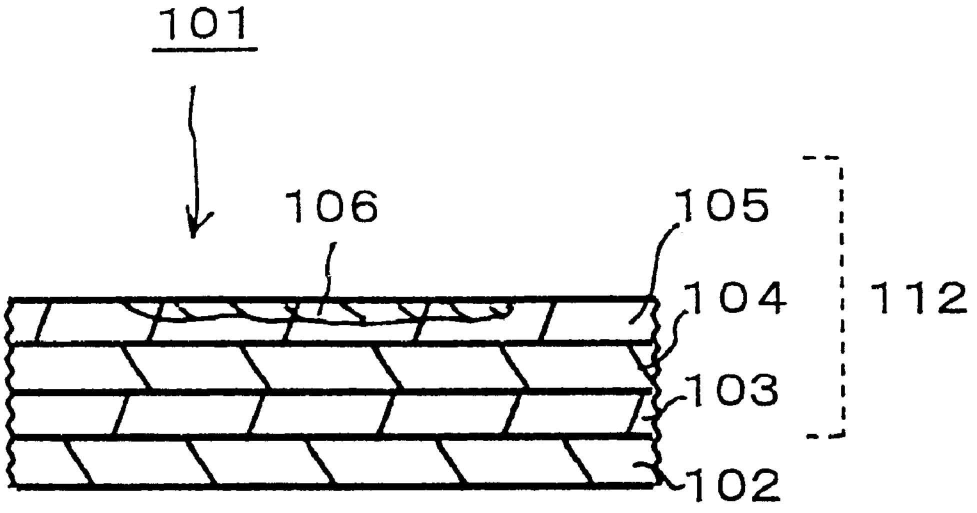
FIG. 12 PRIOR ART
FIG. 12 is a schematically sectional view showing a composition of a typical intermediate transfer recording medium.

In a passport 51, a color picture of one's face 52 and the required matters such as identification matter is printed as shown in FIG. 11. However, a sort of the images and letters are various depending on the position.

For example, in FIG. 11, a picture of the one's face 52 is formed of the sharp color image by various colors of the sublimation dye. The picture positioned at the upper left corner of the passport 51 is formed as a circle, an ellipse or a quadrilateral. The letter such as nationality, address, name, date of birth, and the distinction of sex (hereinafter, referred as nationality and so on 53) formed through use of heat fusible ink at center portion, and OCR readable mark and letters 54 are formed through use of heat fusible ink at the under portion. A fingerprint pattern and a signature 55 is formed by use of sublimation black dye at the right portion.

As a passport 51, when a sort of an image to be printed at a definite portion is fixed, it is preferable to use an adhesive layer transfer sheet 50 suitable for forming thereof. Concretely, shown in FIG. 10, preferably, various colors of the sublimation dye layers 39*y*, 39*m*, 39*c* are arranged such that plane shape and size of the sublimation dye layer 39*y*, 39*m*, 39*c* is corresponded to the area on which a color picture 52 should be formed, the sublimation black dye layer 39*b* is arranged such that plane shape and size of the sublimation black dye layer 39*b* is corresponded to the area on which a fingerprint pattern and a signature 55 should be formed, and the heat fusible ink layer 30 is arranged such that plane shape and size of the heat fusible ink layer 30 is corresponded to the area on which a nationality and so on 53 and OCR readable mark and letters 54 should be formed. According to this method, unnecessary coloring material can save and there avoid waste, so become economical.

The adhesive layer 27 is composed of the uppermost layer 26 having the adhesive property suitable for the receptor layer 8 of the intermediate transfer recording medium 1, and the basement layer 24 having the adhesive property suitable for a passport paper as the transfer-receiving material 42. Plane shape and size of the adhesive layer 27 is corresponded to the image forming area (H×L) of a passport 51, preferably.

Following is description of forming various images to a passport 51. First, various colors of the sublimation dye layer 39 and the heat fusible ink layer 30 is transferred and formed on the receptor layer 8 of the intermediate transfer recording medium 1 from the above described adhesive layer transfer sheet 50 for a passport, such that the formed image on the receptor layer 8 is formed as the reflected image against the image 29 to be formed finally. Then, the adhesive layer 27 is transferred such that the adhesive layer 27 is completely covered the image. The adhesive layer 27 and the receptor layer 8 become to firmly adhere through the uppermost layer 26 having the adhesive property suitable for the receptor layer 8. Accordingly, on the subsequent process, defects of transfer do not occur during transferring on the passport 51.

The intermediate transfer recording medium 1 on which the required images are transferred and formed, is transferred on the passport 51, and the image is formed at the image forming area (H×L). At this time, on the outermost surface of the adhesive layer 27 transferred on the intermediate transfer recording medium 1, the basement layer 24 having the adhesive property suitable for the passport 51 is arranged. Hence, the receptor layer 8 bearing the image 29 is firmly adhered on the passport 51 through use of the basement layer 24, via the adhesive layer 27.

On the intermediate transfer recording medium 1, as above described, a separate layer 3, a protecting layer 4, a hologram layer 5, a transparent vapor deposition layer 6, an anchor layer 7, an ultraviolet rays absorption layer 45, a heat seal layer 46 and the like may be properly arranged. As the intermediate transfer recording medium 1 for a passport, for example shown in FIG. 9, it is preferable that a separate layer 3, a protecting layer 4, a hologram layer 5, a transparent vapor deposition layer 6, an anchor layer 7, and a receptor layer 8 is formed on the base film 2 in this order.

On thus formed passport 51, since the defects of transfer do not occur when the image 29 transfer from the intermediate transfer recording medium 1, separation of the receptor layer 8 and lack of the image do not generate. This is very important thing for the passport or the other identification document in which forming image such as a picture of the one's face 52 and nationality and so on 53 have important meaning.

According to this invention, when the material of the receptor layer 8 and transfer-receiving layer 42 is various, there can be avoid the problems through use of the adhesive layer transfer sheet 21, 31 having the adhesive layer 27 formed of the different materials which have the suitable adhesive property respectively in order to transfer high resolution and high quality image.

EXAMPLE

Hereunder, the adhesive layer transfer sheet according to the present invention will be more concretely explained by way of preferred examples executed. Units of "part(s)"and "%"described in the following examples mean "weight part(s)" and "weight %" respectively as far as a particular note is not there.

[Preparation Example of Sublimation Transfer Sheet]

A polyethylene terephthalate (hereinafter referred as PET) film (LUMIRROR, manufactured by Toray Co., Ltd.) having a thickness of 6 μm was used as a substrate. A primer layer of an urethane resin having a thickness of 0.5 μm was formed on one surface of the substrate, and a heat resistant slip layer having a thickness of 1 μm was formed on another surface, i.e., the back surface of the substrate. Inks of three colors each of which contained a sublimation dye were prepared. The inks thus prepared had the following compositions respectively.

[Composition of Yellow Ink]

Quinophthalone dye expressed by the following formula: 5.5 weight parts

Polyvinyl butyral (ETHLEC BX-1, manufactured by Sekisui Kagaku Kogyo Co., Ltd.): 4.5 weight parts Methyl ethyl ketone/Toluene (1/1) 90.0 weight parts (1)

[Formula of Quinophthalone Dye]

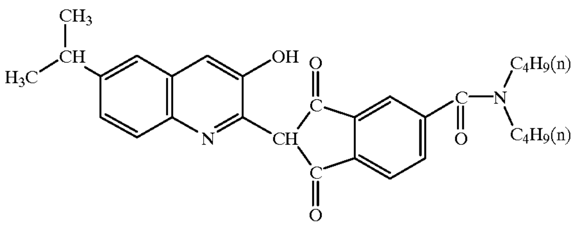

[Composition of Magenta Ink]

A magenta ink was prepared in the same manner as in the preparation of the yellow ink except that C.I. Disperse Red 60 was used as a dye instead of the yellow dye of the above formula.

[Composition of Cyan Ink]

A cyan ink was prepared in the same manner as in the preparation of the yellow ink except that C.I. Solvent Blue 63 was used as a dye instead of the yellow dye of the above formula.

The thus prepared inks were applied, through the gravure printing, on the primer layer already formed on the PET film so as to arrange the yellow, the magenta and the cyan in this order along the surface of the substrate and in a lengthwise direction, and then dried, thereby obtaining a sublimation thermal transfer sheet having sublimation dye layers of three colors. In the sublimation thermal transfer sheet, the each dye layer had a length of 15 cm, and plural sets of yellow, magenta and cyan are repeated. An applied amount of the each dye layer was about 3 g/m$^2$ in a solid component.

Example 1

PET film having a thickness of 6 $\mu$m (LUMIRROR, manufactured by Toray Co., Ltd.) was used as a substrate sheet 22, and on the one side of the film, a silicone resin layer was formed by a gravure coating method as a heat-resistance slip layer having a thickness of 1 $\mu$m. On another side of the film, a release layer 23 was formed by the similar method. And a coating solution for a basement layer having the following composition was applied on the release layer 23 by means of a gravure coating method, and then dried same, thereby forming a basement layer 24 having an applied amount of 2.0 g/m$^2$ in a dried state.

[Composition of Coating Solution for Basement Layer (No. 1)]

polyvinyl pyrrolidone: 20 weight parts (manufactured by ISP company)

Microsilica: 5 weight parts (manufactured by FUJI SILYSIA CHEMICAL LTD.)

isopropyl alcohol: 75 weight parts

Thereafter, a coating solution for a uppermost layer(No. 1) having the following composition was applied on the above mentioned basement layer 24 by means of a gravure coating method, and then dried same, thereby forming a uppermost layer 26 having an applied amount of 3.0 g/m$^2$ in a dried state. Thus an adhesive layer transfer sheet was obtained.

[Composition of Coating Solution for Uppermost Layer (No. 1)]

vinyl chloride-vinyl acetate copolymer: 15 weight parts (DENKA VINYL 1000ALK, manufactured by Denki Kagaku Co., Ltd.)

Copolymer resin reaction-bonding with reactivity ultra-violet rays absorbent: 20 weight parts (UVA635L, manufactured by BASF Japan Co., Ltd.)

Methyl ethyl ketone/Toluene (1/1): 100 weight parts

Example 2

An adhesive layer transfer sheet of the example 2 was formed in the same manner as in the example 1 except that a coating solution for a basement layer(No. 2) having the following composition was used instead of the coating solution for a basement layer(No. 1).

[Composition of Coating Solution for Basement Layer (No. 2)]

polyamide resin: 15 weight parts (PLATABOND, manufactured by Japan Rirusan company)

ethanol 85 weight parts

Example 3

An adhesive layer transfer sheet of the example 3 was formed in the same manner as in the example 1 except that a coating solution for a basement layer(No. 3) having the following composition was used instead of the coating solution for a basement layer(No. 1), and a coating solution for a uppermost layer (No. 2) having the following composition was used instead of the coating solution for a uppermost layer(No. 1).

| | |
|---|---|
| [Composition of Coating Solution for Basement Layer (No.3)] | |
| Ionomer resin dispersion (CHEMIPAL; manufactured by Mitsui Petro Chemical Industries Co., Ltd.) | 30 weight parts |
| Polyvinyl alcohol (manufactured by Kuraray Co., Ltd.) | 5 weight parts |
| Water | 30 weight parts |
| Ethanol | 35 weight parts |
| [Composition of Coating Solution for Uppermost Layer (No.2)] | |
| polyvinyl pyrrolidone (manufactured by ISP company) | 20 weight parts |
| Microsilica (manufactured by FUJI SILYSIA CHEMICAL LTD.) | 5 weight parts |
| isopropyl alcohol | 75 weight parts |

Example 4

An adhesive layer transfer sheet of the example 4 was formed in the same manner as in the example 3 except that the uppermost layer 26 in the example 3 is used as an intermediate layer 25, and a coating solution for a uppermost layer(No. 3) having the following composition was applied on the intermediate layer 25, and then dried same, thereby forming a uppermost layer 26 having an applied amount of 3.0 g/m$^2$ in a dried state.

[Composition of Coating Solution for Uppermost Layer (No. 3)]

vinyl chloride-vinyl acetate copolymer: 15 weight parts (DENKA VINYL 1000ALK, manufactured by Denki Kagaku Co., Ltd.)

Copolymer resin reaction-bonding with reactivity ultra-violet rays absorbent: 20 weight parts (UVA635L, manufactured by BASF Japan Co., Ltd.)

Methyl ethyl ketone/Toluene (1/1): 100 weight parts

Example 5

An adhesive layer transfer sheet of the example 5 was formed in the same manner as in the example 1 except that an uppermost layer 26 and a basement layer 24 was formed on a release layer 23 in this order instead of the basement later 24 and the uppermost layer is formed on the release layer in this order in the example 1.

Comparative Example 1

An adhesive layer transfer sheet of the comparative example 1 was formed in the same manner as in the example 1 except that a basement layer 24 was not arranged.

Comparative Example 2

An adhesive layer transfer sheet of the comparative example 2 was formed in the same manner as in the example 1 except that an uppermost layer 26 was not arranged.

Comparative Example 3

An adhesive layer transfer sheet of the comparative example 3 was formed in the same manner as in the example 4 except that an intermediate layer 25 was not arranged.

Comparative Example 4

An adhesive layer transfer sheet of the comparative example 4 was formed in the same manner as in the example 1 except that a coating solution for an uppermost layer(No. 4) having the following composition was used instead of the coating solution for a uppermost layer(No. 1).

[Composition of Coating Solution for Uppermost Layer (No. 4)]

vinyl chloride-vinyl acetate copolymer (Tg=50° C.): 30 weight parts

Methyl ethyl ketone/Toluene (1/1) 70 weight parts

Comparative Example 5

An adhesive layer transfer sheet of the comparative example 5 was formed in the same manner as in the comparative example 2.

[Forming Printed Product and Evaluation]

First, an image was formed through migrating the sublimation dye to a transfer layer 9 (a receptor layer 8) of an intermediate transfer recording medium 1 preparing in advance, through use of the above described sublimation thermal transfer sheet.

Thereafter, the adhesive layer transfer sheet 21 obtained from the above described example 1 to 4, and comparative example 1 to 4 was prepared, as a first transfer step, the adhesive layer 27 of thus-obtained adhesive layer transfer sheet 21 was pattern-transferred on the transfer layer 9 of the intermediate transfer recording medium 1 on which the image was formed through use of the thermal head 43. At this time, a transferring property was evaluated through observing the adhesive condition of the adhesion layer 27 on the transfer layer 9. Results of the evaluation were shown in Table 1. The adhesive layer 27 in this case is a substance in which, at least, the basement layer 24 and the uppermost layer 26 was arranged in the examples, and at least either one of the basement layer 24 or the uppermost layer 26 was arranged in the comparative example.

Further, as a second transfer step, the transfer layer 9 on which the adhesive layer 27 was transferred, was thermal-transferred on the transfer-receiving material 42 by means of a roller 44, then, the printed product 41 was formed. At the time, a transferring property was evaluated through observing the adhesive condition of the transfer layer 9 on the transfer-receiving material 42. Results of the evaluation were shown in Table 1. In this case, a natural paper was used as the transfer-receiving material 42.

The other hand, an adhesive layer transfer sheet 21 obtained from the example 5 and the comparative example 5 was prepared. As a first transfer step, the adhesive layer 27 of thus-obtained adhesive transfer sheet 21 was pattern-transferred on the transfer-receiving material 42 by means of the thermal head 43. At the time, a transferring property was evaluated through observing the adhesive condition of the transfer layer 27 on the transfer-receiving material 42. Results of the evaluation were shown in Table 1.

Thereafter, as a second transfer step, the transfer layer 9 of the intermediate transfer recording medium 1 on which the image was formed through use of the above described sublimation thermal transfer sheet in advance, was thermal-transferred on the transfer-receiving material 42 on which the adhesive layer 27 was transferred by the first transfer step, by means of a roller 44, then, the printed product 44 was formed. At the time, a transferring property was evaluated through observing the adhesive condition of the transfer layer 9 on the transfer-receiving material 42. Results of the evaluation were shown in Table 1. In this case, a natural paper was used as the transfer-receiving material 42.

The condition of pattern-transferring of the transfer layer 9 transferred on the obtained printed product 41 was observed, that is, the observation whether the transfer-pattern forming by means of a thermal head 43 in the first step, was formed on the transfer-receiving material 42 with a satisfactory transferring property by means of the roller transfer in the second transfer step, was conducted. Result of the observation is also shown in table 1.

Concerning the keeping quality of the adhesive layer transfer sheet 21 rolled up like a roll was also evaluated. The condition of the preservation was at the temperature of 60° C. and for 48 hours. The generation of blocking was evaluated. Result of the evaluation is shown in Table 1.

TABLE 1

| | Transfer Property to I.T.R.M*1 | Transfer Property to T.R.M*2 | Ribbon Keeping Quality (60° C. × 48 hrs) | Pattern Transfer Property |
|---|---|---|---|---|
| Example 1 | O.K. | O.K. | O.K. | O.K. |
| Example 2 | O.K. | O.K. | O.K. | O.K. |
| Example 3 | O.K. | O.K. | O.K. | O.K. |
| Example 4 | O.K. | O.K. | O.K. | O.K. |
| Example 5 | O.K. | O.K. | O.K. | O.K. |
| Comparative Example 1 | O.K. | N.G. I.A.*3 | O.K. | N.G. |
| Comparative Example 2 | N.G. I.A.*3 | O.K. | O.K. | N.G. |
| Comparative Example 3 | N.G. L.S.A.L*4 | N.G. L.S.A.L*4 | O.K. | N.G. |
| Comparative Example 4 | O.K. | O.K. | N.G. G.B.*5 | O.K. |
| Comparative Example 5 | N.G. I.A.*3 | O.K. | O.K. | N.G. |

*1Intermediate Transfer Recording Layer
*2Transfer-Receiving Material
*3Insufficiency Adhesion
*4Layer Separation of Adhesive Layer
*5Generation of Blocking On the example 1 to 5, the adhesive layer 27 composed of the basement layer 24 and the uppermost layer 26, had a excellent adhesive property to both of the transfer layer 9 of the intermediate transfer recording medium 1 and the transfer-receiving material 42, and the obtained printed product 41 showed a satisfactory pattern-transferring property. Further, a blocking did not occur.

On the comparative example 1, the uppermost layer 26 having an excellent adhesive property to the transfer layer 9 of the intermediate transfer recording medium 1, did not show the enough adhesive property to the transfer-receiving material 42.

On the comparative example 2 and 5, the basement layer 24 having the excellent adhesive property to the transfer-receiving material 42, did not show the enough adhesive property to the transfer layer 9 of the intermediate transfer receiving layer 1.

On the comparative example 3, a layer separation occurred between the basement layer 24 and the uppermost layer 26, the transfer property was inferior.

On the comparative example 4, a blocking such that the uppermost layer 26 was stuck to the back surface of the adhesive layer transfer sheet, was occurred.

The printed product 41 obtained by the comparative examples –3, and 5 was inferior about pattern-transferring property.

What is claimed is:

1. A method for forming a printed product comprising steps of;

preparing an intermediate transfer recording medium comprising at least a base film and a transfer layer which comprises at least a receptor layer to be formed on the base film separably and born an image, and usable for transferring the transfer layer after bearing the image on a transfer-receiving material, and an adhesive layer transfer sheet comprising at least a substrate sheet and a transferring adhesive layer formed on the substrate sheet to be separable, in which the transferring adhesive layer comprises at least an uppermost layer having an adhesive property suitable for the receptor layer of the intermediate transfer recording medium and arranged at a farthest portion from the substrate sheet, and a basement layer having an adhesive property suitable for a surface of the transfer-receiving material, forming a different material from a material of the uppermost layer, and arranged at a closest portion from the substrate sheet, carrying out a first transfer step in which the transferring adhesive layer is transferred on the transfer layer bearing the image in advance, and a second transfer step in which the transfer layer on which the transferring adhesive layer is transferred, transfers on the transfer-receiving material, and then the transfer layer bearing the image is transferred on the transfer-receiving material via the transferring adhesive layer, wherein the first transfer step is the step in which a transfer-pattern of the transferring adhesive layer is thermal-transferred on the transfer layer bearing images in advance, and the second is the step in which the transfer layer having the same transfer-pattern as the transfer-pattern formed on the transferring adhesive layer transferred on the transfer layer, is roller-transferred on the transfer-receiving material via the transferring adhesive layer;

wherein the adhesive layer transfer sheet comprises at least one coloring material layer selected from the group consisting of sublimation dye layers having various colors and heat fusible ink layers having various colors, and the transferring adhesive layer, and these layers are formed so as to laterally arranged them along the surface of the substrate sheet, and in the first transfer step, the image is formed through migrating the coloring material from the coloring material layer formed on the adhesive layer transfer sheet, before the transferring adhesive layer of the adhesive layer transfer sheet is transferred on the transfer layer of the intermediate transfer recording medium.

* * * * *